United States Patent
Suda

(10) Patent No.: US 11,844,049 B2
(45) Date of Patent: Dec. 12, 2023

(54) TERMINAL, WIRELESS COMMUNICATION SYSTEM, AND BASE STATION FOR SELECTING A RADIO RESOURCE BASED ON A RESULT OF SENSING

(71) Applicant: FUJITSU LIMITED, Kawasaki (JP)

(72) Inventor: Kenji Suda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 281 days.

(21) Appl. No.: 17/183,875

(22) Filed: Feb. 24, 2021

(65) Prior Publication Data

US 2021/0185644 A1 Jun. 17, 2021

Related U.S. Application Data

(63) Continuation of application No. PCT/JP2018/034311, filed on Sep. 14, 2018.

(51) Int. Cl.
| | | |
|---|---|---|
| H04W 72/02 | (2009.01) | |
| H04W 4/40 | (2018.01) | |
| H04W 76/27 | (2018.01) | |
| H04W 28/26 | (2009.01) | |
| H04W 48/16 | (2009.01) | |
| H04W 48/00 | (2009.01) | |

(52) U.S. Cl.
CPC ............ H04W 72/02 (2013.01); H04W 4/40 (2018.02); H04W 28/26 (2013.01); H04W 48/16 (2013.01); H04W 48/17 (2013.01); H04W 76/27 (2018.02)

(58) Field of Classification Search
CPC ....... H04W 72/02; H04W 4/40; H04W 76/27; H04W 28/26; H04W 48/16; H04W 48/17; H04W 72/04; H04W 52/02; H04W 76/10; H04W 36/00011; H04B 1/7075
See application file for complete search history.

(56) References Cited

U.S. PATENT DOCUMENTS

| | | | |
|---|---|---|---|
| 10,764,867 B2* | 9/2020 | Chae | H04W 72/0446 |
| 2011/0314099 A1* | 12/2011 | Imai | H04L 65/1046 |
| | | | 709/204 |
| 2013/0040679 A1 | 2/2013 | Kashiwase | |
| 2017/0093538 A1* | 3/2017 | Yoon | H04B 7/0626 |

(Continued)

FOREIGN PATENT DOCUMENTS

| | | |
|---|---|---|
| CA | 3 036 351 A1 | 10/2017 |
| JP | 2011-233984 A | 11/2011 |

(Continued)

OTHER PUBLICATIONS

Notice of Preliminary Rejection issued by the Korean Intellectual Property Office for corresponding Korean Patent Application No. 10-2021-007210, dated Jan. 9, 2023, with an English translation.

(Continued)

*Primary Examiner* — Mewale A Ambaye
(74) *Attorney, Agent, or Firm* — Myers Wolin, LLC

(57) ABSTRACT

A terminal includes a controller and transmitter. The controller configured to select, based on a result of sensing, a radio resource for transmitting the signal. The transmitter configured to transmit a signal. When the controller detects a predetermined first event, the controller removes a radio resource belonging to a first reserved region from selection targets.

14 Claims, 14 Drawing Sheets

(56) References Cited

U.S. PATENT DOCUMENTS

| | | | |
|---|---|---|---|
| 2017/0188391 A1* | 6/2017 | Rajagopal | H04W 28/0284 |
| 2017/0332207 A1* | 11/2017 | Sheng | H04W 4/027 |
| 2018/0092065 A1* | 3/2018 | Sheng | H04W 74/006 |
| 2018/0234220 A1 | 8/2018 | Yasukawa et al. | |
| 2018/0234888 A1 | 8/2018 | Yasukawa et al. | |
| 2019/0208504 A1 | 7/2019 | Yasukawa et al. | |
| 2022/0104178 A1* | 3/2022 | Lee | H04W 72/02 |
| 2022/0150032 A1* | 5/2022 | Lee | H04W 92/18 |

FOREIGN PATENT DOCUMENTS

| | | |
|---|---|---|
| JP | 2017-147649 A | 8/2017 |
| JP | 2018-26736 A | 2/2018 |
| WO | 2017/026511 A1 | 2/2017 |
| WO | 2017/026545 A1 | 2/2017 |

OTHER PUBLICATIONS

Intel Corporation, "Support of Sidelink Unicast, Groupcast and Broadcast Modes for NR V2X Communication", Agenda Item: 7.2.4.1.1, 3GPP TSG-RAN WG1 Meeting #94, R1-1808693, Gothenburg, Sweden, Aug. 20-24, 2018.

CMCC, "Discussion on NR Uu control LTE sidelink", Agenda Item: 7.2.4.3.2, 3GPP TSG-RAN WG1 Meeting #94, R1-1808839, Gothenburg, Sweden, Aug. 20-24, 2018.

Caict, "Considerations on Resource Allocation of NR V2X Sidelink", Agenda Item: 7.2.4.1.4, 3GPP TSG-RAN WG1 Meeting #94, R1-1809287, Gothenburg, Sweden, Aug. 20-24, 2018.

Extended European search report with the supplementary European search report and the European search opinion issued by the European Patent Office for corresponding European Patent Application No. 18933647.2-1215, dated Sep. 9, 2021.

Huawei et al., "Collision avoidance for Mode 2", Agenda Item: 6.2.8.1.1, 3GPP TSG RAN WG1 Meeting #83, R1-156932, Anaheim, USA, Nov. 15-22, 2015.

3GPP TS 36.211 V15.1.0, "3rd Generation Partnership Project; Technical Specification Group Radio Access Network; Evolved Universal Terrestrial Radio Access (E-UTRA); Physical channels and modulation (Release 15)", Mar. 2018.

3GPP TS 36.212 V15.1.0, "3rd Generation Partnership Project; Technical Specification Group Radio Access Network; Evolved Universal Terrestrial Radio Access (E-UTRA); Multiplexing and channel coding (Release 15)", Mar. 2018.

3GPP TS 36.213 V15.1.0, "3rd Generation Partnership Project; Technical Specification Group Radio Access Network; Evolved Universal Terrestrial Radio Access (E-UTRA); Physical layer procedures (Release 15)", Mar. 2018.

3GPP TS 36.300 V15.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Mar. 2018.

3GPP TS 36.321 V15.1.0, "3rd Generation Partnership Project; Technical Specification Group Radio Access Network; Evolved Universal Terrestrial Radio Access (E-UTRA); Medium Access Control (MAC) protocol specification (Release 15)", Mar. 2018.

3GPP TS 36.322 V15.0.1, "3rd Generation Partnership Project; Technical Specification Group Radio Access Network; Evolved Universal Terrestrial Radio Access (E-UTRA); Radio Link Control (RLC) protocol specification (Release 15)", Apr. 2018.

3GPP TS 36.323 V14.5.0, "3rd Generation Partnership Project; Technical Specification Group Radio Access Network; Evolved Universal Terrestrial Radio Access (E-UTRA); Packet Data Convergence Protocol (PDCP) specification (Release 14)", Dec. 2017.

3GPP TS 36.331 V15.1.0, "3rd Generation Partnership Project; Technical Specification Group Radio Access Network; Evolved Universal Terrestrial Radio Access (E-UTRA); Radio Resource Control (RRC); Protocol specification (Release 15)", Mar. 2018.

3GPP TS 36.413 V15.1.0, "3rd Generation Partnership Project; Technical Specification Group Radio Access Network; Evolved Universal Terrestrial Radio Access Network (E-UTRAN); S1 Application Protocol (S1AP) (Release 15)", Mar. 2018.

3GPP TS 36.423 V15.1.0, "3rd Generation Partnership Project; Technical Specification Group Radio Access Network; Evolved Universal Terrestrial Radio Access Network (E-UTRAN); X2 application protocol (X2AP) (Release 15)", Mar. 2018.

3GPP TS 36.425 V14.1.0, "3rd Generation Partnership Project; Technical Specification Group Radio Access Network; Evolved Universal Terrestrial Radio Access Network (E-UTRAN); X2 interface user plane protocol (Release 14)", Mar. 2018.

3GPP TS 37.340 V15.1.0, "3rd Generation Partnership Project; Technical Specification Group Radio Access Network; Evolved Universal Terrestrial Radio Access (E-UTRA) and NR; Multi-connectivity; Stage 2 (Release 15)", Mar. 2018.

3GPP TS 38.201 V15.0.0, "3rd Generation Partnership Project; Technical Specification Group Radio Access Network; NR; Physical layer; General description (Release 15)", Dec. 2017.

3GPP TS 38.202 V15.1.0, "3rd Generation Partnership Project; Technical Specification Group Radio Access Network; NR; Services provided by the physical layer (Release 15)", Mar. 2018.

3GPP TS 38.211 V15.1.0, "3rd Generation Partnership Project; Technical Specification Group Radio Access Network; NR; Physical channels and modulation (Release 15)", Mar. 2018.

3GPP TS 38.212 V15.1.1, "3rd Generation Partnership Project; Technical Specification Group Radio Access Network; NR; Multiplexing and channel coding (Release 15)", Apr. 2018.

3GPP TS 38.213 V15.1.0, "3rd Generation Partnership Project; Technical Specification Group Radio Access Network; NR; Physical layer procedures for control (Release 15)", Mar. 2018.

3GPP TS 38.214 V15.1.0, "3rd Generation Partnership Project; Technical Specification Group Radio Access Network; NR; Physical layer procedures for data (Release 15)", Mar. 2018.

3GPP TS 38.215 V15.1.0, "3rd Generation Partnership Project; Technical Specification Group Radio Access Network; NR; Physical layer measurements (Release 15)", Mar. 2018.

3GPP TS 38.300 V15.1.0, "3rd Generation Partnership Project; Technical Specification Group Radio Access Network; NR; NR and NG-RAN Overall Description; Stage 2 (Release 15)", Mar. 2018.

3GPP TS 38.321 V15.1.0, "3rd Generation Partnership Project; Technical Specification Group Radio Access Network; NR; Medium Access Control (MAC) protocol specification (Release 15)", Mar. 2018.

3GPP TS 38.322 V15.1.0, "3rd Generation Partnership Project; Technical Specification Group Radio Access Network; NR; Radio Link Control (RLC) protocol specification (Release 15)", Mar. 2018.

3GPP TS 38.323 V15.1.0, "3rd Generation Partnership Project; Technical Specification Group Radio Access Network; NR; Packet Data Convergence Protocol (PDCP) specification (Release 15)", Mar. 2018.

3GPP TS 38.331 V15.1.0, "3rd Generation Partnership Project; Technical Specification Group Radio Access Network; NR; Radio Resource Control (RRC) protocol specification (Release 15)", Mar. 2018.

3GPP TS 38.401 V15.1.0, "3rd Generation Partnership Project; Technical Specification Group Radio Access Network; NG-RAN; Architecture description (Release 15)", Mar. 2018.

3GPP TS 38.410 V0.9.0, "3rd Generation Partnership Project; Technical Specification Group Radio Access Network; NG-RAN; NG general aspect and principles (Release 15)", Apr. 2018, with cover sheet, clean version, and marked up version.

3GPP TS 38.413 V0.8.0, "3rd Generation Partnership Project; Technical Specification Group Radio Access Network; NG-RAN; NG Application Protocol (NGAP) (Release 15)", Apr. 2018, with cover sheet, clean version, marked up version, and list of open issues.

3GPP TS 38.420 V0.8.0, "3rd Generation Partnership Project; Technical Specification Group Radio Access Network; NG-RAN; Zn general aspects and principles (Release 15)", Apr. 2018, with cover sheet, clean version, and marked up version.

(56) References Cited

OTHER PUBLICATIONS

3GPP TS 38.423 V0.8.0, "3rd Generation Partnership Project; Technical Specification Group Radio Access Network; NG-RAN; Xn application protocol (XnAP) (Release 15)", Apr. 2018, with cover sheet, clean version, and marked up version.
3GPP TS 38.470 V15.1.0, "3rd Generation Partnership Project; Technical Specification Group Radio Access Network; NG-RAN; F1 general aspects and principles (Release 15)", Mar. 2018.
3GPP TS 38.473 V15.1.1, "3rd Generation Partnership Project; Technical Specification Group Radio Access Network; NG-RAN; F1 application protocol (F1AP) (Release 15)", Apr. 2018.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V14.3.1, "3rd Generation Partnership Project; Technical Specification Group Radio Access Network; Study on channel model for frequency spectrum above 6 GHz (Release 14)", Jul. 2017.
3GPP TR 38.912 V14.1.0, "3rd Generation Partnership Project; Technical Specification Group Radio Access Network; Study on New Radio (NR) access technology (Release 14)", Jun. 2017.
3GPP TR 38.913 V14.3.0, "3rd Generation Partnership Project; Technical Specification Group Radio Access Network; Study on Scenarios and Requirements for Next Generation Access Technologies; (Release 14)", Jun. 2017.
International Search Report and Written Opinion of the International Searching Authority issued by the Japan Patent Office for corresponding International Patent Application No. PCT/JP2018/034311, dated Nov. 20, 2018, with an English translation.
Molina-Masegosa et al., "LTE-V for Sidelink 5G V2X Vehicular Communications: A New 5G Technology for Short-Range Vehicle-to-Everything Communications", IEEE Vehicular Technology Magazine, vol. 12, pp. 30-39, Dec. 2017.
Intel Corporation, "Sidelink Resource Allocation Mechanisms for NR V2X Communication", Agenda Item: 7.2.4.1.4, 3GPP TSG-RAN WG1 Meeting #94, R1-1808696, Gothenburg, Sweden, Aug. 20-24, 2018.
CATT, "Considerations on resource allocation mechanism in NR V2X", Agenda Item: 7.2.4.1.4, 3GPP TSG-RAN WG1 Meeting #94, R1-1808402, Gothenburg, Sweden, Aug. 20-24, 2018.
Examination Report issued by the Patent Office of India for corresponding Indian Patent Application No. 202137008859, dated Feb. 2, 2022, with an English translation.
First Notification of Office Action issued by the China National Intellectual Property Administration for corresponding Chinese Patent Application No. 201880097441.4, dated Apr. 24, 2023, with an English translation.
Notice of Final Rejection issued by the Korean Intellectual Property Office for corresponding Korean Patent Application No. 10-2021-007210, dated Jul. 20, 2023, with an English translation.
Communication pursuant to Article 94(3) EPC issued by the European Patent Office for corresponding European Patent Application No. 18 933 647.2-1215, dated Oct. 11, 2023.

\* cited by examiner

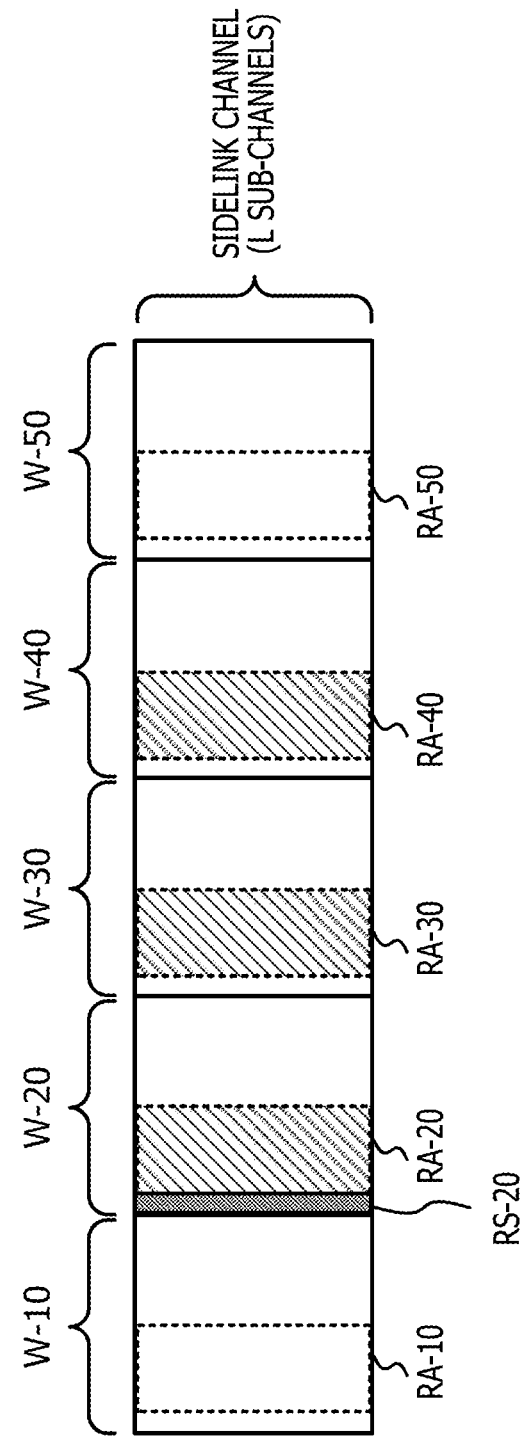

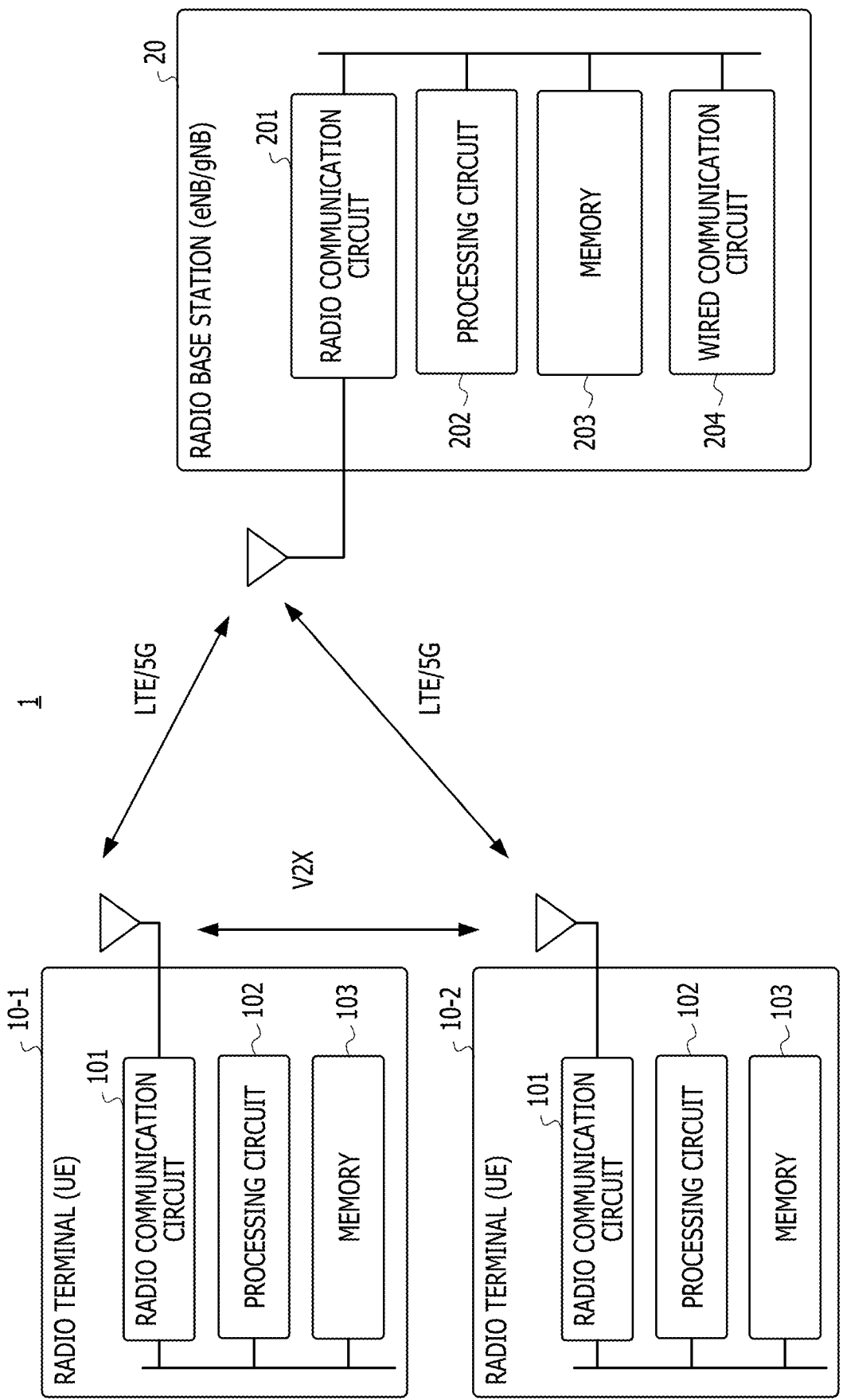

TERMINAL, WIRELESS COMMUNICATION SYSTEM, AND BASE STATION FOR SELECTING A RADIO RESOURCE BASED ON A RESULT OF SENSING

CROSS-REFERENCE TO RELATED APPLICATION

This application is a continuation application of International Application PCT/JP2018/034311 filed on Sep. 14, 2018 and designated the U.S., the entire contents of which are incorporated herein by reference.

FIELD

The embodiments discussed herein is related to a terminal, a wireless communication system that may enable direct communication between radio terminals without the intermediary of a radio base station, and base station.

BACKGROUND

In recent years, various use cases have been assumed for radio communication systems (may also referred to as mobile communication systems), such as a mobile phone system (cellular system), and discussion has been made on the next-generation wireless communication technology for achieving further increases in speed, capacity, and the like of wireless communications (may also referred to as mobile communication). For example, the 3rd Generation Partnership Project (3GPP) that is a standardizing body already formulated the specifications of the communication standard that is called Long-Term Evolution (LTE) and the specifications of the communication standard that is based on the LTE wireless communication technology and is called LTE-Advanced, and research is ongoing to expand those functions. For example, discussion has been made on the standardization of fifth-generation mobile communication systems (may also referred to as 5G systems) that achieve the operation scenario presented by the International Telecommunication Union Radio communication sector (ITU-R) and details of technical conditions presented by the ITU-R.

In the discussion on foregoing the standardization, the main focus is placed on matters relating to wireless communication between a radio base station and a radio terminal, but discussion is also underway on matters relating to wireless communication between radio terminals. For example, as a technology relating to wireless communication between a radio terminal (in-vehicle terminal) installed in a vehicle and another radio terminal, a vehicle-to-everything (V2X) technology is known.

The V2X technology has been achieved by extending the Device-to-Device (D2D) technology defined for LTE to incorporate the use of intelligent transport systems (ITSs). The V2X technology is a collective term of technologies relating to a plurality of communication forms in ITSs and includes, for example, vehicle-to-vehicle (V2V) that is the form of communication between vehicles, vehicle-to-infrastructure (V2I) that is the form of communication between a vehicle and a road side unit (RSU), vehicle-to-pedestrian (V2P) that is the form of communication between a vehicle and a radio terminal of a pedestrian, vehicle-to-network (V2N) that is the form of communication between a vehicle and a communication device on a network, and the like. V2V may be also referred to as "inter-vehicle communication". V2I may be also referred to as "road-to-vehicle communication". V2P may be also referred to as "vehicle-to-pedestrian communication". V2N may be also referred to as "vehicle-to-network communication".

In the V2X technology, in addition to the two modes (Mode 1 and Mode 2) for the D2D technology, Mode 3 in which a radio base station schedules a resource for V2X communication and Mode 4 in which a radio terminal autonomously selects a resource for V2X communication are also added.

Related techniques are disclosed in for example 3GPP TS 36.211 V15.1.0 (2018-03), 3GPP TS 36.212 V15.1.0 (2018-03), 3GPP TS 36.213 V15.1.0 (2018-03), 3GPP TS 36.300 V15.1.0 (2018-03), 3GPP TS 36.321 V15.1.0 (2018-03), 3GPP TS 36.322 V15.0.1 (2018-04), 3GPP TS 36.323 V14.5.0 (2017-12), 3GPP TS 36.331 V15.1.0 (2018-03), 3GPP TS 36.413 V15.1.0 (2018-03), 3GPP TS 36.423 V15.1.0 (2018-03), 3GPP TS 36.425 V14.1.0 (2018-03), 3GPP TS 37.340 V15.1.0 (2018-03), 3GPP TS 38.201 V15.0.0 (2017-12), 3GPP TS 38.202 V15.1.0 (2018-03), 3GPP TS 38.211 V15.1.0 (2018-03), 3GPP TS 38.212 V15.1.1 (2018-04), 3GPP TS 38.213 V15.1.0 (2018-03), 3GPP TS 38.214 V15.1.0 (2018-03), 3GPP TS 38.215 V15.1.0 (2018-03), 3GPP TS 38.300 V15.1.0 (2018-03), 3GPP TS 38.321 V15.1.0 (2018-03), 3GPP TS 38.322 V15.1.0 (2018-03), 3GPP TS 38.323 V15.1.0 (2018-03), 3GPP TS 38.331 V15.1.0 (2018-03), 3GPP TS 38.401 V15.1.0 (2018-03), 3GPP TS 38.410 V0.9.0 (2018-04), 3GPP TS 38.413 V0.8.0 (2018-04), 3GPP TS 38.420 V0.8.0 (2018-04), 3GPP TS 38.423 V0.8.0 (2018-04), 3GPP TS 38.470 V15.1.0 (2018-03), 3GPP TS 38.473 V15.1.1 (2018-04), 3GPP TR 38.801 V14.0.0 (2017-04), 3GPP TR 38.802 V14.2.0 (2017-09), 3GPP TR 38.803 V14.2.0 (2017-09), 3GPP TR 38.804 V14.0.0 (2017-03), 3GPP TR 38.900 V14.3.1 (2017-07), 3GPP TR 38.912 V14.1.0 (2017-06), 3GPP TR 38.913 V14.3.0 (2017-06), and "LTE-V for Sidelink 5G V2X," IEEE Vehicular Technology Magazine, Vol. 12, pp. 30-39, December 2017.

SUMMARY

According to an aspect of the embodiments, a terminal includes a controller configured to select, based on a result of sensing, a radio resource for transmitting the signal; and a transmitter configured to transmit a signal, wherein when the controller detects a predetermined first event, the controller removes a radio resource belonging to a first reserved region from selection targets.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram illustrating an example of a time range to which an urgent event is assigned in a sidelink channel according to Embodiment 3;

FIG. 13 is a diagram illustrating an example of a hardware configuration of the radio terminals and a hardware configuration of a radio base station in the wireless communication system.

DESCRIPTION OF EMBODIMENTS

Figure 1:
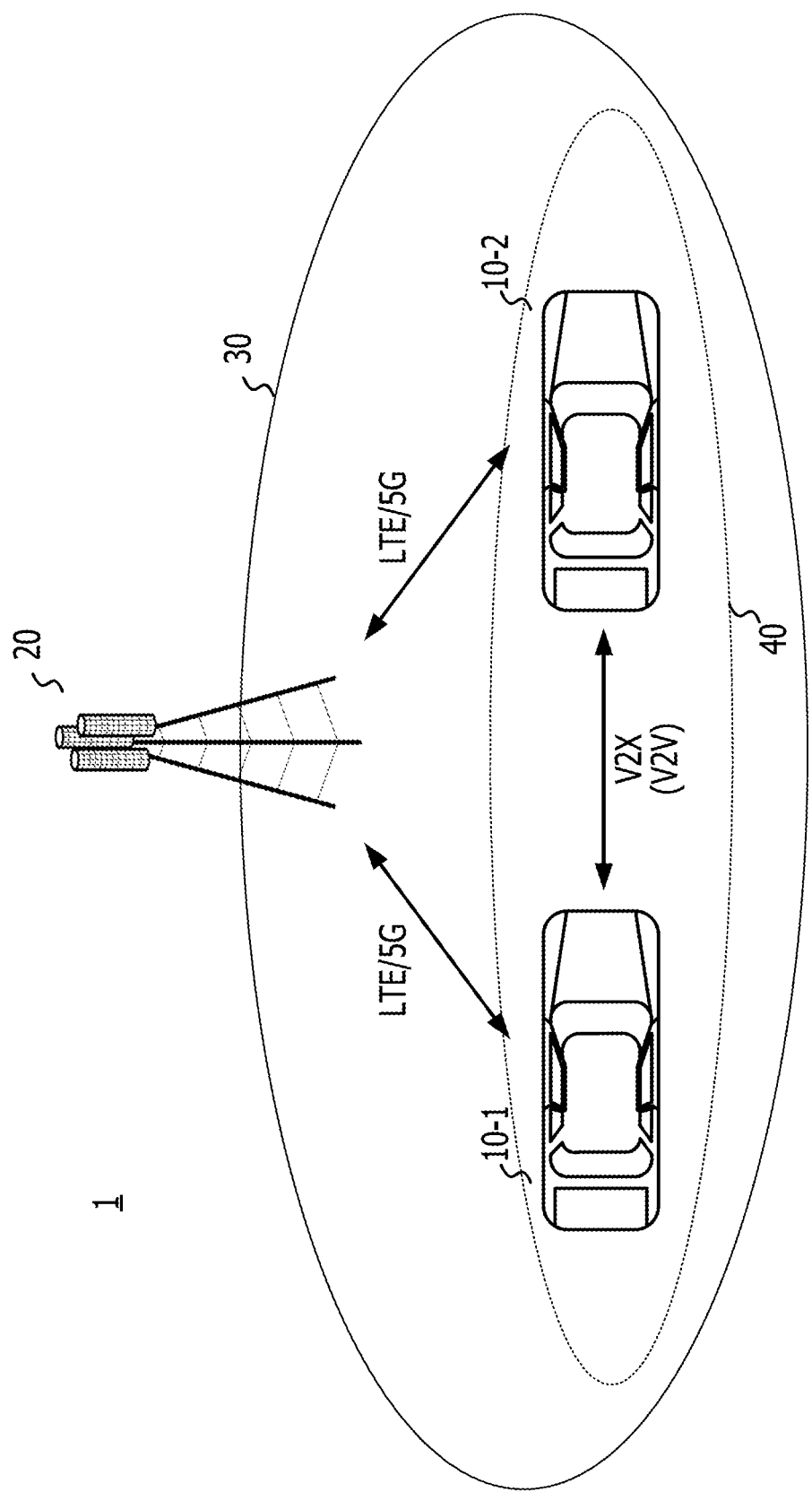
FIG. 1 is a diagram illustrating an example of a configuration of a wireless communication system according to Embodiment 1.

In the related art, in Mode 4 for the V2X technology, a radio terminal operates to autonomously select a radio resource for V2X communication. For example, a radio terminal that participates in the V2X communication observes a radio resource in a range of a selection window (may also referred to as a selection window) that repeatedly comes at predetermined intervals, and generates information (may also referred to as a resource pool) on one or more candidate free resources (candidate single-subframe resources (CSRs)) available to transmit a V2X signal. The radio terminal transmits the V2X signal using a radio resource (may also referred to as a CSR) randomly selected from the resource pool.

When the number of CSRs included in the resource pool is smaller than a threshold (for example, when the percentage of the available CSRs among the CSRs included in the selection window is lower than 20%), a condition for selecting a CSR is relaxed and a process of setting the resource pool is repeatedly executed again.

When the number of radio terminals that participate in the V2X communication increases, the number of CSRs included in the resource pool may be reduced by randomly selecting a radio resource by each of the plurality of radio terminals. A radio terminal in the V2X communication may select a resource once and exclusively use (may also referred to as reserve) the selected radio resource across a plurality of selection windows.

Therefore, in the V2X communication, a delay in the V2X communication may increase due to repetitive execution of the process of setting the resource pool. The same applies to a radio terminal that may transmit urgent information.

In discussion on standardization of V2X communication, there is not much discussion on the problem that a delay in V2X communication may increase, and a sufficient solution has yet to be presented.

An object of techniques disclosed herein is to provide a radio terminal and a wireless communication system that may effectively suppress a delay in V2X communication or the like in the wireless communication system that may select a radio resource based on a result of sensing.

Hereinafter, embodiments for implementing the present invention (hereinafter, also referred to as Embodiments and Examples) will be described with reference to the drawings. Configurations of the following embodiments are an example for embodying technical ideas of the present invention and do not intend to limit the present invention to the configurations of the embodiments and may be applied in other embodiments included in the claims in the same manner. For example, it is considered that names, such as V2X communication and V2V communication, may be changed in discussion on standardization of future 4G and 5G systems. It is also considered that names of various channels, such as a physical sidelink control channel (PSCCH) and a physical sidelink shared channel (PSSCH), may be changed in the discussion on the standardization of the future 4G and 5G systems. Various names, such as sidelink control information (SCI), a transport block (TB), a resource block (RB), a reserved sub-channel (RS), a $1^{st}$ reserved area (RA), and a candidate single-subframe resource (CSR), may be changed in the discussion on the standardization of the future 4G and 5G systems. Note that the present invention does not intend to limit constituent components of the present disclosure to those using these names.

The following embodiments may be appropriately combined and implemented. All details of the above related art (for example, 3GPP TS 38.211 V15.1.0 (2018-03)) are incorporated herein by reference. The release numbers of NPL 1 to 38 are an example. For example, all details of the above related art corresponding to the latest release numbers disclosed at the time of the application of the present disclosure are also incorporated herein by reference. In the present disclosure, V2X communication is an example of a wireless communication system that may select a radio resource based on a result of sensing. For example, the V2X communication may be referred to as device to device communication.

Embodiment 1

In Embodiment 1, a wireless communication system that includes radio terminals configured to select a radio resource for transmitting a signal based on a result of sensing is exemplified. According to an aspect of Embodiment 1, the radio terminal may be configured to remove, from selection targets, a radio resource belonging to a first reserved region when the radio terminal detects a predetermined first event (may also referred to as an urgent event). For example, the radio terminal that has detected the first event suppresses signal transmission to be executed using the radio resource belonging to the first reserved region. As a result, the radio terminal (may also referred to as a radio terminal in an urgent mode) that may transmit urgent information may execute communication using the radio resource belonging to the first reserved region. According to another aspect of Embodiment 1, the radio terminal may be configured to output an urgent event when the radio terminal may transmit urgent information. The radio terminal in the urgent mode outputs the urgent event, thereby causing the other radio terminal (may also referred to as a radio terminal that is not in the urgent mode) to remove, from the selection targets, the radio resource belonging to the first reserved region. As a result, it may be possible to effectively suppress a delay in the V2X communication (may also referred to as device to device communication) of the radio terminal that may transmit the urgent information.

FIG. 1 is a diagram illustrating an example of a configuration of a wireless communication system 1 according to Embodiment 1. The wireless communication system 1 illustrated in FIG. 1 includes a radio terminal 10-1, a radio terminal 10-2, and a radio base station 20. The radio terminal 10-1 and the radio terminal 10-2 may be also referred to as radio terminals 10 when they are not distinguished from one another. In FIG. 1, the radio terminals 10 may be in-vehicle terminals installed in vehicles or may be radio terminals installed in moving bodies other than vehicles. For example, the radio terminals 10 may be radio terminals installed in moving bodies, such as train vehicles, ships, or airplanes. The V2X communication according to the present disclosure may be executed by the radio terminals installed in moving bodies in the foregoing broad sense. Alternatively, the radio terminals 10 may be radio terminals installed in immovable objects, such as roadside units. The V2X communication according to the present disclosure may be, for example, executed by radio terminals installed in immovable objects, such as traffic lights (may also referred to as roadside units).

Note that the radio terminal 10 and the radio base station 20 that are illustrated in FIG. 1 has a plurality of performances (may also referred to as aspects or perspectives) that are abstractly represented. For example, the radio base station 20 may be composed of a combination of a plurality of devices. In FIG. 1, the two radio terminals 10 (for example, the radio terminals 10-1 and 10-2) are exemplified. However, the wireless communication system 1 may include three or more radio terminals 10. For example, the radio base station 20 may establish radio connecting with the plurality of radio terminals 10.

The radio terminals 10-1 and 10-2 illustrated in FIG. 1 may execute wireless communication conforming to a wireless communication standard, such as LTE or 5G, with the radio base station 20 within a cell 30 formed by the radio base station 20. In the present disclosure, the cell 30 formed by the radio base station 20 may be appropriately interpreted as a radio area, a sector, a radio range, a radio service area, a macrocell, a small cell, a picocell, or the like. Note that the size of the cell 30 is not limited to the size illustrated in FIG. 1.

In FIG. 1, the radio terminals 10-1 and 10-2 are located in a range 40 (may also referred to as a V2X communication range) in which the radio terminals 10-1 and 10-2 may execute the V2X communication (may also referred to as V2V communication) with each other. The V2X communication is an example of wireless communication (may also referred to as devise to devise wireless communication) in which the radio terminal 10-1 and the radio terminal 10-2 directly transmit and receive a wireless signal to and from each other without the intermediary of the radio base station 20. For example, when a distance between the radio terminals 10-1 and 10-2 is smaller than a predetermined value, the radio terminals 10-1 and 10-2 may belong to the range 40 in which the V2X communication may be executed. The position of the range 40 in which the V2X communication may be executed may be changed due to the movements of the radio terminals 10-1 and 10-2, and the range 40 in which the V2X communication may be executed may be formed outside the cell 30 formed by the radio base station 20. Note that the size of the range 40 in which the V2X communication may be executed is not limited to the size illustrated in FIG. 1.

Each of the radio terminal 10-1 and the radio terminal 10-2 is configured to execute sensing in a first time window (may also referred to as a sensing window) of a predetermined first time length and select a radio resource for transmitting a signal in the V2X communication based on a result of the sensing.

Figure 2:
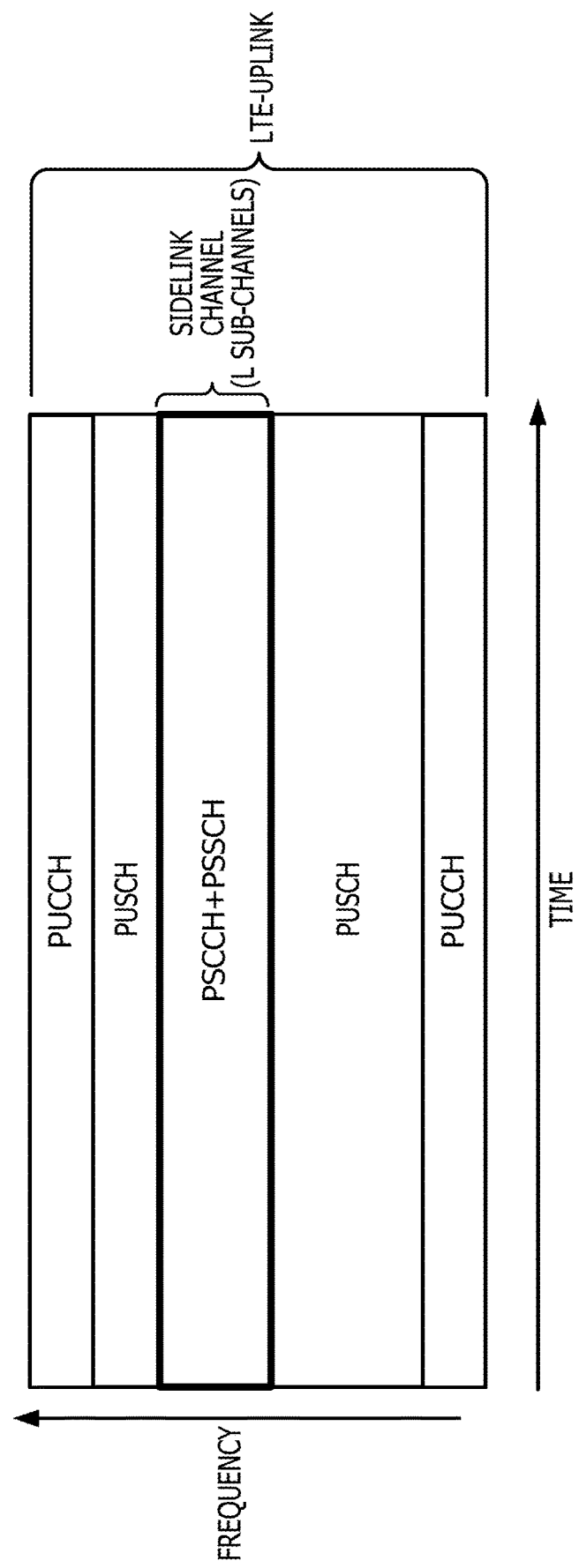
FIG. 2 is a diagram illustrating an example of the allocation of radio resources for V2X communication in a radio channel configuration of each of radio terminals.

FIG. 2 is a diagram illustrating an example of the allocation of radio resources for the V2X communication in a radio channel configuration of the radio terminal 10. FIG. 2 illustrates a time axis in a lateral direction and a frequency axis in a vertical direction. The radio channel configuration illustrated in FIG. 2 is based on an LTE uplink radio channel configuration. For example, in the radio channel configuration illustrated in FIG. 2, physical uplink control channels (PUCCHs) are allocated to the top end and the bottom end in the frequency axis direction, and a physical uplink shared channel (PUSCH) is allocated between the two PUCCHs.

In the example of FIG. 2, a sidelink channel that is a radio resource for the V2X communication is allocated at an arbitrary position in the PUSCH in the frequency axis direction. The sidelink channel may be further divided into a number L of sub-channels in the frequency axis direction and may include a physical sidelink control channel (PSCCH) that may be used to transmit a control signal, and a physical sidelink shared channel (PSSCH) that may be used to transmit a data signal. There are some variations of a sub-channel configuration of the sidelink channel. For example, in a first scheme (may also referred to as an adjacent PSCCH+PSSCH scheme), a radio resource that may be used in the PSCCH and a radio resource that may be used in the PSSCH are allocated adjacent to each other. In a second scheme (may also referred to as a nonadjacent PSCCH+PSSCH scheme), a radio resource that may be used in the PSCCH and a radio resource that may be used in the PSSCH may not be allocated adjacent to each other. Setting information on the configuration of the sidelink channel for the V2X communication may be stored in memories of the radio terminals 10 in advance or may be set from the radio base station 20 via wireless communication. For example, the radio terminals 10 may receive, from the radio base station 20, a radio resource control (RRC) message including the setting information on the configuration of the sidelink channel for the V2X communication. For example, the radio base station 20 may be configured to transmit the RRC message including the setting information on the configuration of the sidelink channel for the V2X communication. The setting information may include, for example, setting information on the first reserved region according to the present disclosure. For example, the RRC message may include the setting information on the first reserved region according to the present disclosure. The setting information on the first reserved region may include, for example, information to be used by the radio terminals 10 to identify the position of the first reserved region and the size of the first reserved region.

Figure 3:
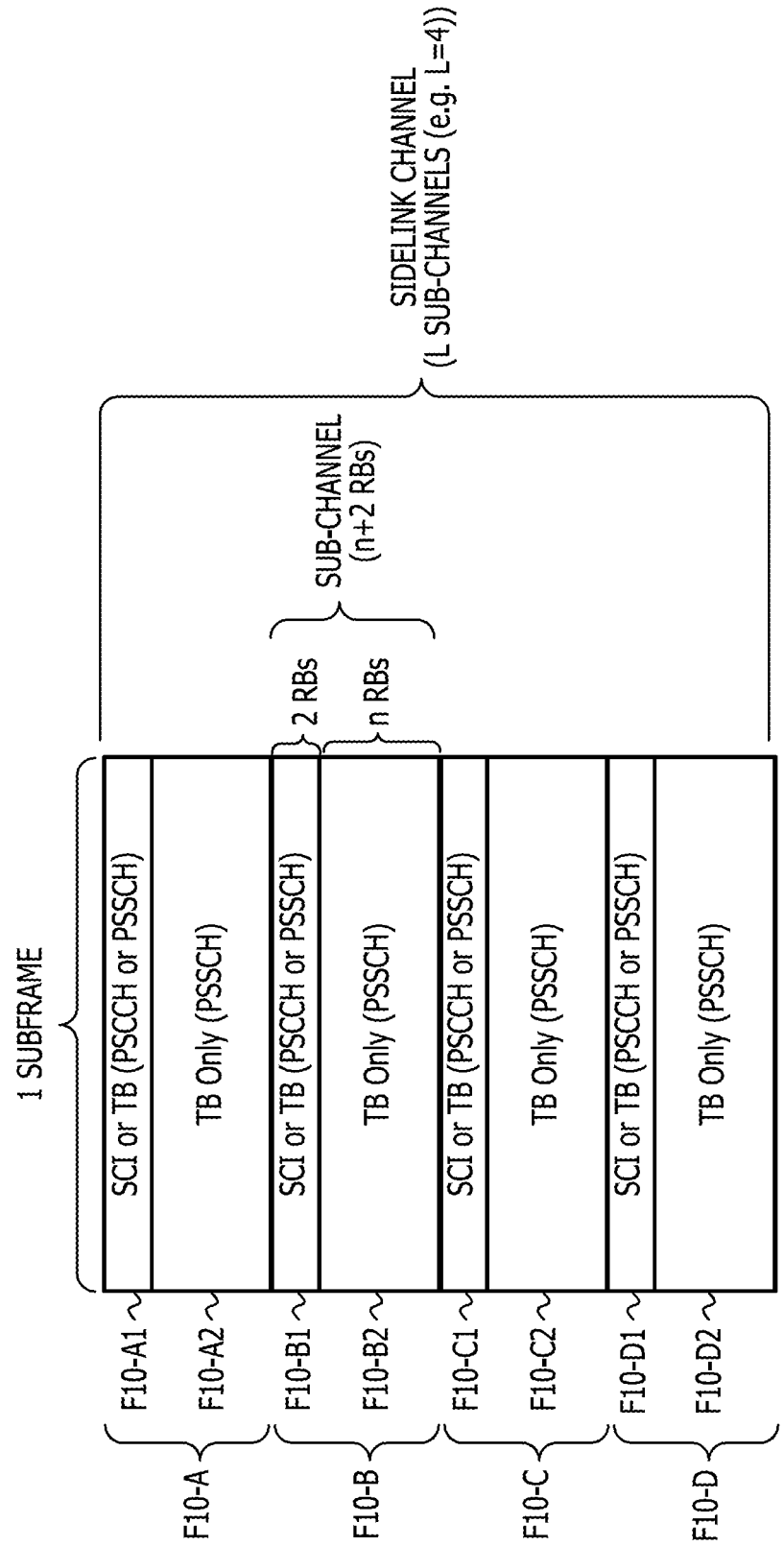
FIG. 3 is a diagram illustrating an example of a sub-channel configuration of a sidelink channel.

FIG. 3 is a diagram illustrating an example of the sub-channel configuration of the sidelink channel. The sub-channel configuration illustrated in FIG. 3 is composed of four sub-channels (F10-A, F10-B, F10-C, and F10-D) as an example. FIG. 3 illustrates a frequency axis in a vertical direction and a time axis in a lateral direction. For example, in FIG. 3, the four sub-channels are allocated in the vertical direction, and subframes, each of which has a predetermined time length, are allocated in the lateral direction.

The sub-channel configuration illustrated in FIG. 3 is based on the foregoing first scheme. For example, each of the sub-channels (F10-A, F10-B, F10-C, and F10-D) is allocated such that first radio resources (F10-A1, F10-B1, F10-C1, and F10-D1) that may be used in the PSCCH and the second radio resources (F10-A2, F10-B2, F10-C2, and F10-D2) that may be used in the PSSCH are adjacent.

In FIG. 3, each of the first radio resources is used to transmit sidelink control information (SCI) that is a control signal, and is used to transmit a transport block (TB) that is a data signal. For example, each of the first radio resources is composed of two resource blocks (RBs). For example, each of the first radio resources may be a PSCCH or may be a PSSCH.

On the other hand, the second radio resource may be used only to transmit a TB that is a data signal. The second radio resource is composed of one or more RBs (for example, a number n of RBs). For example, only a PSSCH may be mapped to the second radio resource.

Figure 4:
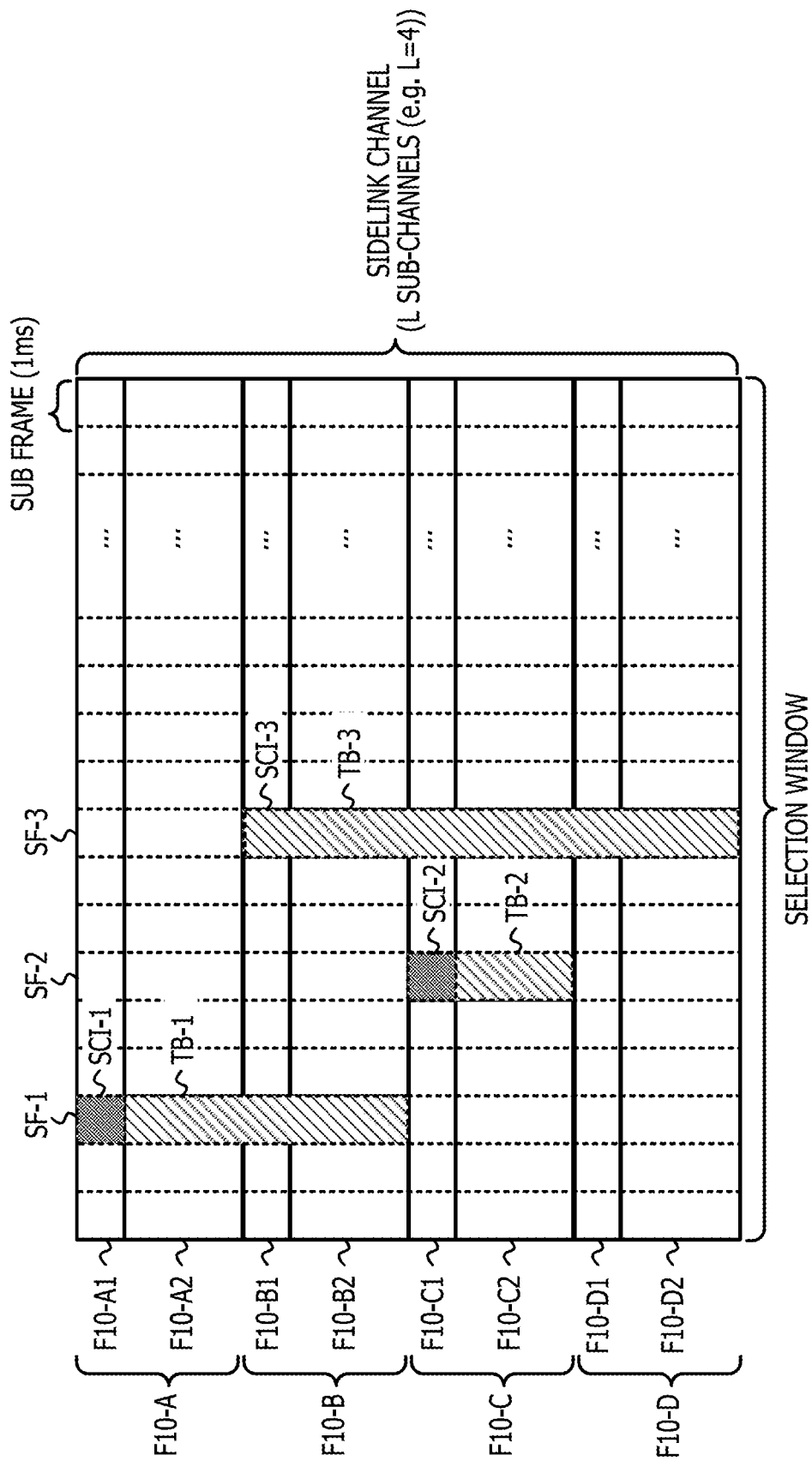
FIG. 4 is a diagram illustrating an example of signal mapping in the sub-channel configuration of the sidelink channel.

FIG. 4 is a diagram illustrating an example of signal mapping in the sub-channel configuration of the sidelink channel. The sidelink channel illustrated in FIG. 4 is composed of four sub-channels (F10-A, F10-B, F10-C, and F10-D) in the same manner as the example illustrated in FIG. 3. The number of sub-channels is merely an example, and the sidelink channel may be composed of 4 or more sub-channels or of 3 or less sub-channels.

FIG. 4 illustrates a frequency axis in a vertical direction and a time axis in a lateral direction. For example, in FIG. 4, the four sub-channels are allocated in the vertical direction, and subframes, each of which has a predetermined time length (for example, 1 ms), are allocated in the lateral direction. In the lateral direction of FIG. 4, a second time window (also referred to as a selection window) including a plurality of subframes and having a second time length is allocated.

In the signal mapping example illustrated in FIG. 4, signals are mapped to the third subframe (SF-1) from the left end, the sixth subframe (SF-2) from the left end, and the ninth subframe (SF-3) from the left end. Note that the subframes are concepts in the time axis direction and are, for example, concepts that abstract the positions of radio resources in the frequency axis direction.

In FIG. 4, in the third subframe (SF-1), a control signal (SCI-1) is mapped to the first radio resource (F10-A1) of the first sub-channel (F10-A) from the top end. A data signal (TB-1) associated with the control signal (SCI-1) is mapped to the second radio resource (F10-A2) of the first sub-channel (F10-A), the first radio resource (F10-B1) of the second sub-channel (F10-B), and the second radio resource (F10-B2) of the second sub-channel (F10-B). For example, the data signal (TB-1) is mapped across the two sub-channels (F10-A and F10-B). For example, the data signal (TB-1) may be mapped across three or more sub-channels. The control signal (SCI-1) may include, for example, information on the positions and lengths of the radio resources to which the data signal (TB-1) is mapped, information on a modulation method of the data signal (TB-1), and the like.

In FIG. 4, in the sixth subframe (SF-2), a control signal (SCI-2) is mapped to the first radio resource (F10-C1) of the third sub-channel (F10-C) from the top end. A data signal (TB-2) associated with the control signal (SCI-2) is mapped to the second radio resource (F10-C2) of the third sub-channel (F10-C). The control signal (SCI-2) may include, for example, information on the position and length of the radio resource to which the data signal (TB-2) is mapped, information on a modulation method of the data signal (TB-2), and the like.

In FIG. 4, in the ninth subframe (SF-3), a control signal (SCI-3) is mapped to the first radio resource (F10-B1) of the second sub-channel (F10-B) from the top end. A data signal (TB-3) associated with the control signal (SCI-3) is mapped to the second radio resource (F10-B2) of the second sub-channel (F10-B), the first radio resource (F10-C1) of the third sub-channel (F10-C), the second radio resource (F10-C2) of the third sub-channel (F10-C), the first radio resource (F10-D1) of the fourth sub-channel (F10-D), and the second radio resource (F10-D2) of the fourth sub-channel (F10-D). The control signal (SCI-3) may include, for example, information on the positions and lengths of the radio resources to which the data signal (TB-3) is mapped, information on a modulation method of the data signal (TB-3), and the like.

As illustrated in FIG. 4, in the sidelink channel, pairs of the control signals (SCI-1, SCI-2, and SCI-3) and the data signals (TB-1, TB-2, and TB-3) are mapped to the radio resources. As illustrated in FIG. 4, the control signals and the data signals that form the pairs may be mapped to adjacent radio resources or may be mapped to nonadjacent radio resources. For example, the example of FIG. 4 is merely an example of the foregoing first scheme (may also be referred to as the adjacent PSCCH+PSSCH scheme). The techniques disclosed herein may be used for the second scheme (may also be referred to as the nonadjacent PSCCH+PSSCH scheme).

The radio terminal 10 executes the sensing to select, from the sub-channel configuration of the sidelink channel, a radio resource to be used for the V2X communication. For example, the radio terminal 10 executes the sensing in a first time window (may also referred to as a sensing window) of a predetermined first time length, determines radio resources likely to be available based on a result of the sensing, and randomly selects a radio resource from a group of the radio resources (may also referred to as a resource pool) determined to be likely to be available.

Figure 5:
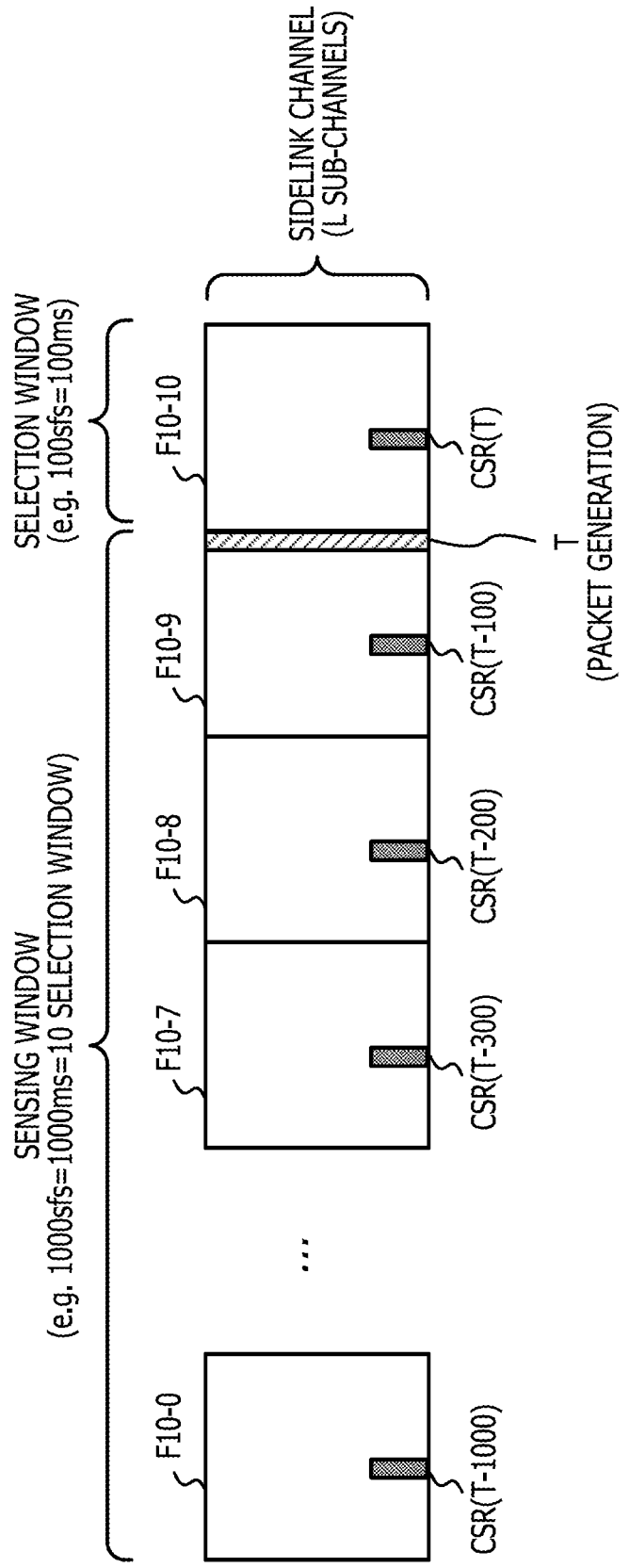
FIG. 5 is a diagram illustrating an example of sensing in the V2X communication.

FIG. 5 is a diagram illustrating an example of the sensing in the V2X communication. In FIG. 5, it is assumed that a packet to be transmitted in the V2X communication is occurred in a radio terminal 10 at time T. The radio terminal 10 randomly selects a radio resource likely to be available from a resource pool for a second time window (may also referred to as a selection window) (F10-10) of a predetermined second time length (of, for example, 100 ms (=100 subframes)). For example, the radio terminal 10 randomly selects a radio resource available for the V2X communication from the resource pool for the second time window (F10-10). The resource pool that is used in this case is set based on a result of the sensing executed before the second time window (F10-10) in which the radio resource is selected.

For example, the resource pool for the second time window (F10-10) may be set based on a result of the sensing executed in a first time window (may also referred to as a sensing window) of the first time length (of, for example, 1000 ms (=1000 subframes) (=10 selection windows)). As illustrated in FIG. 5, the first time window may include a plurality of second time windows (F10-0 to F10-9). In FIG. 5, the first time window includes ten second time windows and has a time length of 1000 ms (1 second).

In the resource pool for the second time window (F10-10), candidate radio resources (may also referred to as candidate single-subframe resources (CSRs)) are set in units of sub-channels of each of subframes included in the second time window. The radio terminal 10 determines, based on results of the sensing executed in the plurality of second time windows (F10-0 to F10-9) included in the first time window, whether or not each of the candidate radio resources included in the second time window is available for the V2X communication.

In FIG. 5, the radio terminal 10 executes the sensing on the candidate radio resources (CSR(T-1000) to CSR(T-100)), each of which corresponds to the candidate radio resource (CSR(T)), in each of the plurality of second time windows (F10-0 to F10-9) included in the first time window at before the time T which the packet is occurred. The radio terminal 10 uses the results of the sensing to determine the candidate radio resource (CSR(T)). In the example illustrated in FIG. 5, the first time window includes the ten second time windows (F10-0 to F10-9), and the radio terminal 10 executes the sensing on the radio resources, each of which corresponds to the candidate radio resource (CSR(T)), in the first time window and obtains ten sensing results. The radio terminal 10 may calculate the average value from values indicated in the plurality of sensing results which are obtained by executing the sensing in the first time window.

In the setting of the resource pool, for example, the following conditions are used. For example, the "first condition" is that mapping of a data signal to a candidate radio resource is not indicated in a control signal (SCI). The "second condition" is that the average of results of measuring the candidate radio resource is smaller than a threshold. Here, the measurement result of the second condition need to be reflected a signal level of the V2X communication in the first time window. For example, the signal level may be a received signal strength indicator (RSSI), a reference signals received power (RSRP), a signal-to-noise ratio (SNR), a reference signal received quality (RSRQ), or the like. For example, in FIG. 5, when the average value of the measurement results (CSR(T-1000) to CSR(T-100)) in the first time window is smaller than the threshold (may also referred to as a selection threshold), the candidate radio resource (CSR(T)) in the second time window may satisfy the second condition. Above of the first and second conditions may be AND conditions or may be OR conditions. For example, when the first and second conditions are AND conditions, the candidate radio resource may be determined to be available for the V2X communication when both the first and second conditions are satisfied. On the other hand, when the first and second conditions are OR conditions, the candidate radio resource may be determined to be available for the V2X communication when either the first condition or the second condition is satisfied.

The radio terminal 10 may execute the foregoing process relating to the setting of the resource pool every time a second time window of the second time length elapses, regardless of whether a packet is generated. When the percentage of the number of candidate radio resources available for the V2X communication is smaller than a predetermined value in the latest setting of the resource pool, the radio terminal 10 may execute the selection again by adding a predetermined value (of, for example, 3 dB) to the selection threshold and determining whether the foregoing second condition is satisfied. Therefore, it is expected to increase the percentage of the number of candidate radio resources available for the V2X communication.

In Mode 4 for the V2X communication, each of the radio terminals 10 selects a radio resource to be used for the V2X communication based on a sensing result, as described above. Therefore, as the number of radio resources used increases, it may become more difficult to find a candidate radio resource likely to be available. For example, transmission timing in the V2X communication may be delayed by repeating the process of setting the resource pool until the percentage of the number of candidate radio resources available for the V2X communication becomes equal to or higher than a predetermined value (of, for example, 20% of the total).

Therefore, in the wireless communication system 1 according to Embodiment 1, the first reserved region is set in a second time window of the sidelink channel. When an urgent event is detected by a first radio terminal among the plurality of radio terminals 10, the radio resource belonging to the first reserved region is removed from selection targets for radio resources for the V2X communication by the first radio terminal. The urgent event is output by a second radio terminal that is among the plurality of radio terminals 10 and may transmit urgent information. The second radio terminal is an example of a radio terminal 10 that may transmit urgent information. For example, the radio terminal 10 may be the first radio terminal or the second radio terminal, according to a situation. Alternatively, only a specific radio terminal 10 configured in advance may be permitted to be the second radio terminal.

Figure 6:
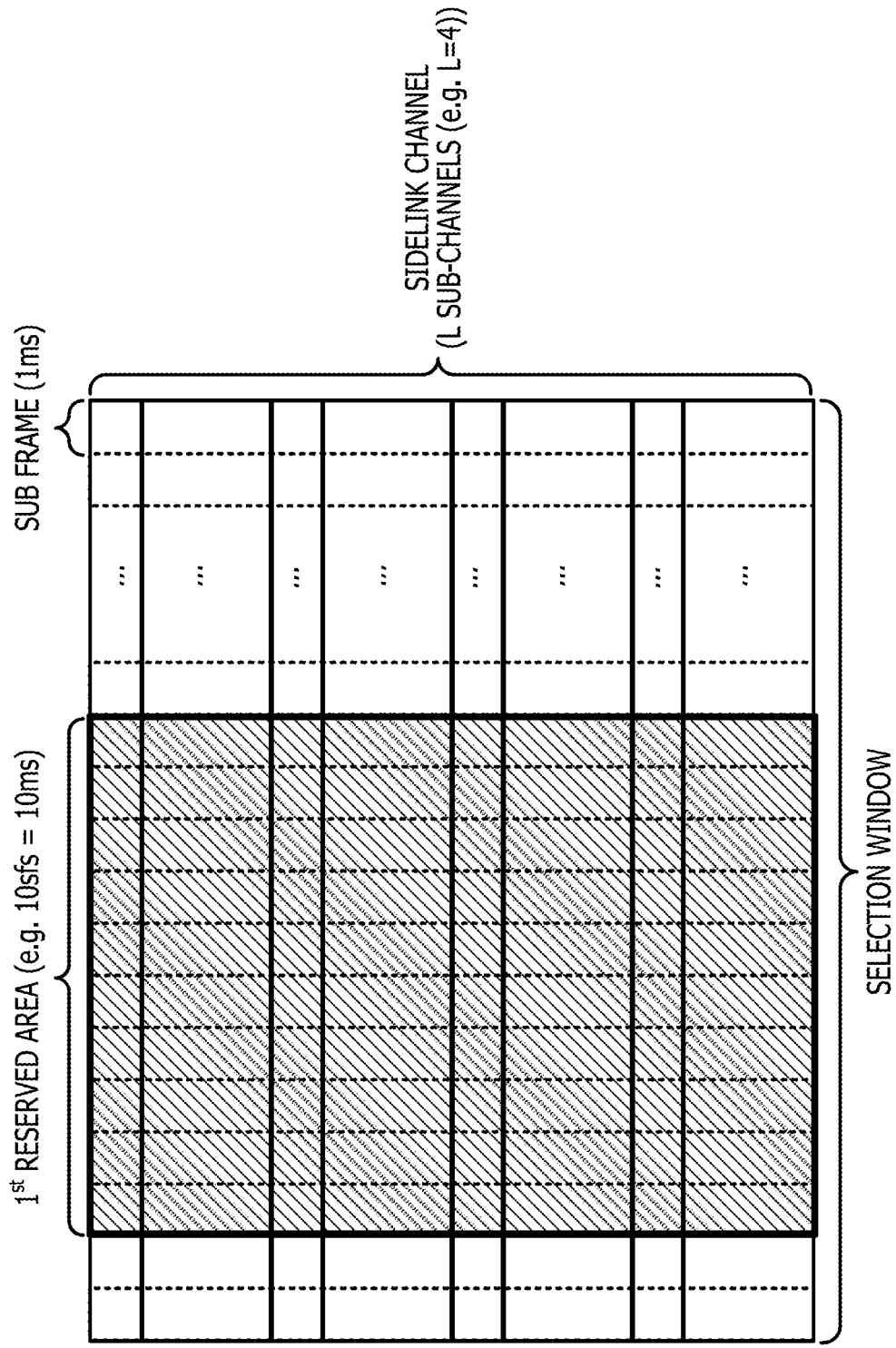
FIG. 6 is a diagram illustrating an example of a first reserved region in a second time window of the sidelink channel according to Embodiment 1.

FIG. 6 is a diagram illustrating an example of the first reserved region in the second time window of the sidelink channel according to Embodiment 1. In FIG. 6, the first reserved region ($1^{st}$ reserved area) configures 10 subframe lengths (of, for example, 10 ms) in a second time window (may also referred to as a selection window) and includes the third subframe from the start of the second time window as a start point and the twelfth subframe from the start of the second time window as an end point. In FIG. 6, the first reserved region is allocated such that the first reserved region includes all the four sub-channels included in the sidelink channel in the frequency axis direction. The first reserved region illustrated in FIG. 6 is merely an example of the present disclosure. For example, the first reserved region may have the same length as that of the second time window in the time axis direction or may have a shorter length than that of the second time window in the time axis direction. The first reserved region may have the same size as that of the sidelink channel in the frequency axis direction or may have a smaller size than that of the sidelink channel in the frequency axis direction. The first reserved region may be allocated such that any of subframes within the second time window is the start point in the time axis direction. Further, the first reserved region may be allocated to any of the sub-channels within the sidelink channel in the frequency axis direction.

As illustrated in FIG. 6, a plurality of candidate radio resources may belong to the first reserved region. As long as an urgent event is not detected, the plurality of candidate radio resources belonging to the first reserved region may be used by each of the radio terminals 10. For example, in the foregoing resource pool setting process, it may be determined whether the plurality of candidate radio resources belonging to the first reserved region are available in the same manner as other candidate radio resources, and the plurality of candidate radio resources belonging to the first reserved region may be used by each of the radio terminals 10. However, when an urgent event is detected, the radio terminal 10 that has detected the urgent event releases the plurality of candidate radio resources belonging to the first reserved region from the resource pool generated by the foregoing resource pool setting process. Therefore, the radio terminal 10 that may transmit urgent information may output the urgent event and may select a radio resource to be used for the V2X communication from among the plurality of candidate radio resources belonging to the first reserved region.

Figure 7:
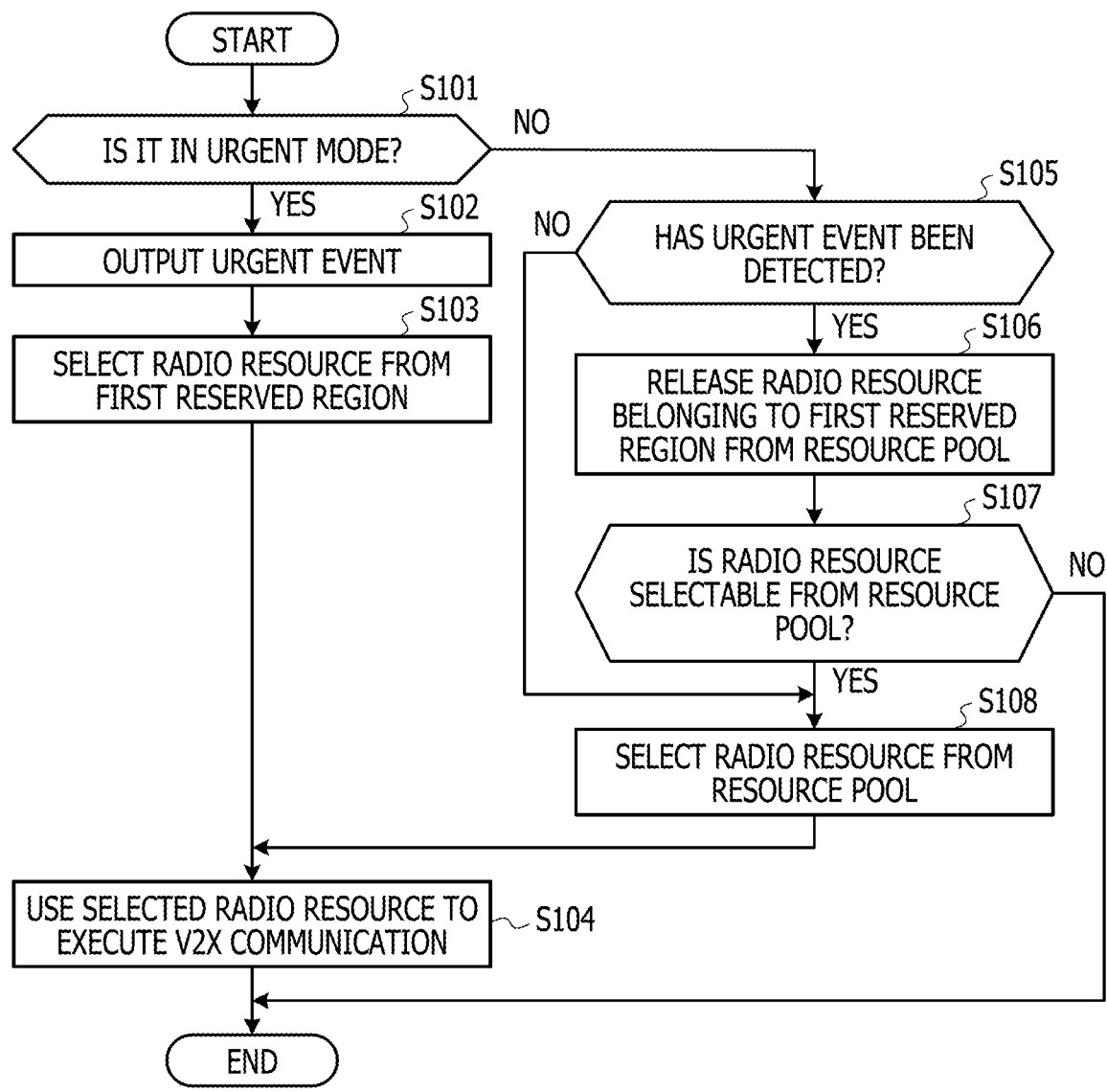
FIG. 7 is a diagram illustrating an example of a process procedure by the radio terminal according to Embodiment 1.

FIG. 7 is a diagram illustrating an example of a process procedure by the radio terminal according to Embodiment 1. The example of the process procedure illustrated in FIG. 7 may be, for example, executed with a timing, as a trigger, of generation a packet to be transmitted in the V2X communication. The example of the process procedure illustrated in FIG. 7 may be, for example, executed with a timing, as a trigger, of arrival a start point of a second time window (may also referred to as a selection window) when a packet to be transmitted in the V2X communication is present in a buffer. These are examples of the trigger when the process procedure illustrated in FIG. 7 is executed. The process procedure illustrated in FIG. 7 may be executed at other timing.

The radio terminal 10 determines whether or not the radio terminal 10 is in the urgent mode (S101). In S101, when a packet to be transmitted in the V2X communication includes urgent information (may also referred to as a packet, data, or a signal), the radio terminal 10 may determine that the radio terminal 10 is in the urgent mode (YES in S101). On the other hand, in S101, when the packet to be transmitted in the V2X communication does not include the urgent information, the radio terminal 10 may determine that the radio terminal 10 is not in the urgent mode (NO in S101).

Note that, only a specific radio terminal 10 (may also referred to as a second radio terminal) set in advance may be configured to make the determination (S101) of the urgent mode. For example, the radio terminal 10 other than the specific radio terminal 10 set in advance may be configured to omit the execution of the determination (S101) of the urgent mode and transition to NO in S101. For example, the radio terminal 10 other than the specific radio terminal 10 set in advance may be configured to start the process from S105 among processes illustrated in FIG. 7. The foregoing operational difference may be controlled by ON and OFF of a flag set in the memory included in the radio terminal 10. For example, when the predetermined flag stored in the memory is set to ON, the radio terminal 10 may be controlled such that the radio terminal 10 starts the process illustrated in FIG. 7 from S101. For example, when the predetermined flag stored in the memory is set to OFF, the radio terminal 10 may be controlled such that the radio terminal 10 starts the process illustrated in FIG. 7 from S105.

When the radio terminal 10 determines that the radio terminal 10 is in the urgent mode in S101 (YES in S101), the radio terminal 10 outputs an urgent event (S102) and selects, from the first reserved region ($1^{st}$ reserved area), a radio resource to be used for the V2X communication (S103). The urgent event may be output using any of physical phenomena. For example, in S102, the radio terminal 10 may transmit, as a radio wave, a signal including a predetermined signal sequence indicating the urgent event. The predetermined signal sequence indicating the urgent event may be, for example, generated using a predetermined numerical sequence, such as a Zadoff-Chu sequence or a CAZAC sequence. In the case where the radio terminal 10 transmits, as the radio wave, the signal (may also referred to as an urgent event signal) including the predetermined signal sequence indicating the urgent event, the radio terminal 10 may be configured to output the urgent event using a wireless communication circuit and an antenna that are used for the V2X communication.

In S102, the radio terminal 10 may transmit, as a sound wave, the signal including the predetermined signal sequence indicating the urgent event. In the case where the radio terminal 10 transmits, as the sound wave, the signal (may also referred to as an urgent event signal) including the predetermined signal sequence indicating the urgent event, the radio terminal 10 may be configured to output the urgent event using a speaker, an alarming horn (may also referred to as a horn or a vehicle horn), a siren, a megaphone, or the like. The urgent event signal output as the sound wave may be, for example, a siren sound emitted by an emergency vehicle when traveling for an emergency. Alternatively, the urgent event signal output as the sound wave may be a horn sound emitted by a moving body, such as a vehicle or a ship, for an emergency.

The radio terminal 10 that output the urgent event in S102 uses the selected radio resource to execute the V2X communication (S104). The radio terminal 10 outputs the urgent event in S102, thereby causing the radio resource belonging to the first reserved region to be released from the resource pool of the other radio terminal 10. Therefore, the radio terminal 10 may quickly transmit using the radio resource belonging to the first reserved region.

On the other hand, when the radio terminal 10 determines that the radio terminal 10 is not in the urgent mode in S101 (No in S101), the radio terminal 10 determines whether or not the radio terminal 10 has detected the urgent event (S105). The radio terminal 10 may be configured to execute the process (S105) of determining whether or not the radio terminal 10 has detected the urgent event when the predetermined flag stored in the memory is set to OFF.

In S105, the radio terminal 10 may detect the urgent event output as the sound wave based on the input signal from an audio signal input device, such as a microphone. For example, the radio terminal 10 transforms the input signal from the audio signal input device into a frequency component by a Fast-Fourier transform (may also referred to as FFT) unit and compares the frequency component with a predetermined reference frequency component stored in the memory in advance. When a degree of matching between the frequency component acquired from the input signal and the reference frequency component is equal to or larger than a threshold, the radio terminal 10 may determine that the urgent event has been detected. On the other hand, when the degree of the matching between the frequency component acquired from the input signal and the reference frequency component is smaller than the threshold, the radio terminal 10 may determine that the urgent event has not been detected.

In S105, the radio terminal 10 may detect the urgent event output as the radio wave, based on the signal acquired by the antenna and the wireless communication circuit that are used for the V2X communication. For example, the radio terminal 10 monitors (may also referred to as sensing) radio resources of the sidelink channel for the V2X communication. When the signal (may also referred to as the urgent event signal) including the predetermined signal sequence indicating the urgent event is detected, the radio terminal 10 may determine that the urgent event has been detected. On the other hand, when the signal including the predetermined signal sequence indicating the urgent event is not detected in the radio resources of the sidelink channel for the V2X communication, the radio terminal 10 may determine that the urgent event has not been detected. A radio resource to which the urgent event signal is mapped may be allocated in a fixed manner in the sidelink channel for the V2X communication. For example, a predetermined subframe within the second time window of the sidelink channel may be reserved as the radio resource to which the urgent event signal is mapped. For example, the radio resource reserved for the urgent event signal may be also referred to as a second reserved region.

Figure 8:
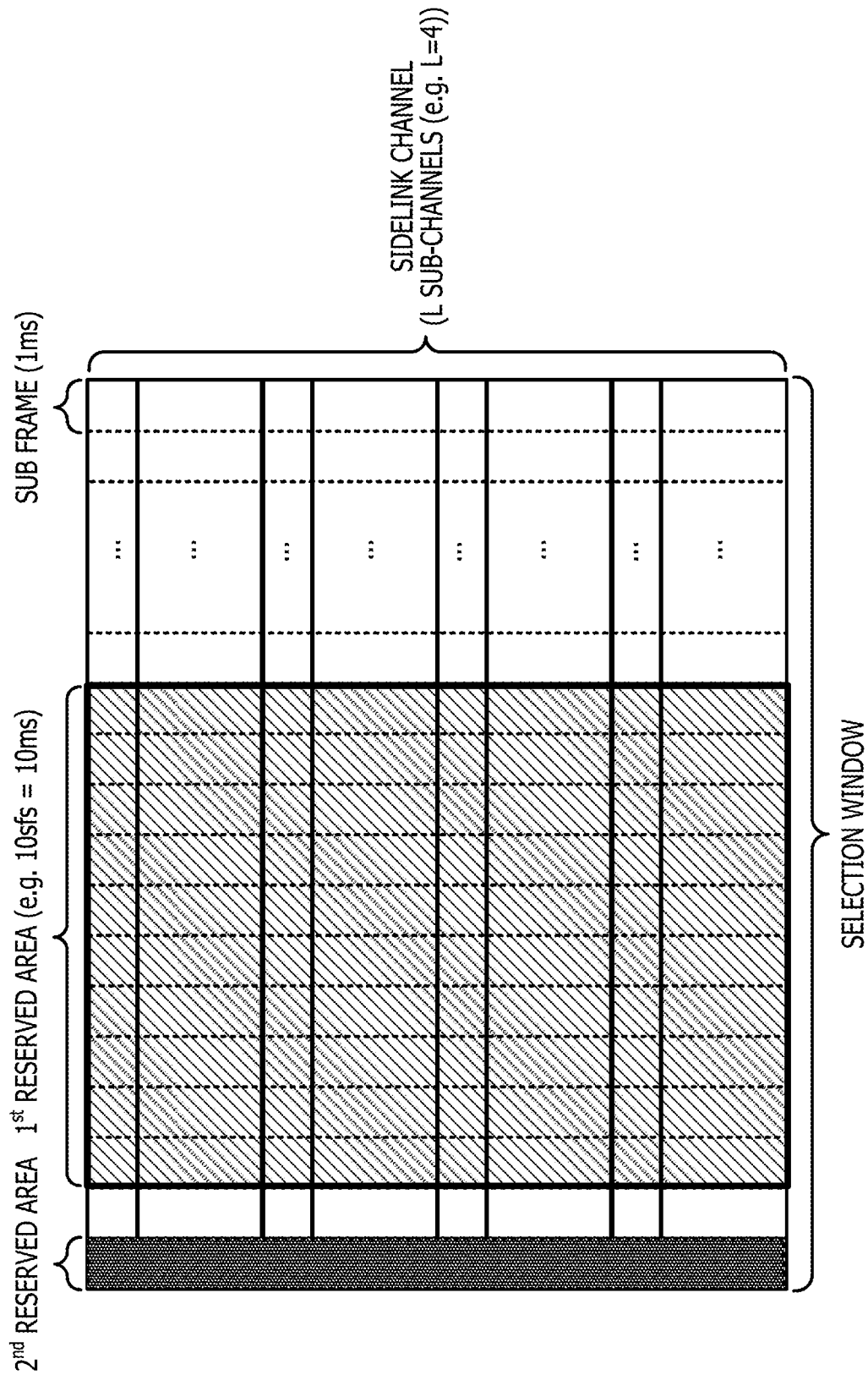
FIG. 8 is a diagram illustrating an example of the first reserved region and a second reserved region in the second time window of the sidelink channel according to Embodiment 1.

FIG. 8 is a diagram illustrating an example of the first reserved region and the second reserved region in the second time window of the sidelink channel according to Embodiment 1. As illustrated in FIG. 8, the first reserved region ($1^{st}$ reserved area) and the second reserved region ($2^{nd}$ reserved area) are allocated in the second time window (selection window) of the sidelink channel. The first reserved region illustrated in FIG. 8 is the same as the first reserved region illustrated in FIG. 6 and will not be described. The second reserved region illustrated in FIG. 8 is allocated to the first subframe from the top of the second time window in the time axis direction. The second reserved region illustrated in FIG. 8 has the same size as that of the sidelink channel in the frequency axis direction, but is an example. For example, the second reserved region may be smaller than the sidelink channel in the frequency axis direction and/or may be allocated to any of the plurality of sub-channels included in the sidelink channel.

As illustrated in FIG. 8, since the second reserved region reserved for the urgent event signal is allocated to the top subframe of the second time window, the radio terminal 10 may detect the urgent event at relatively early time. For example, the radio terminal 10 may monitor only radio resources belonging to the second reserved region in the determination process of S105. The urgent event signal may not be mapped to all the radio resources belonging to the second reserved region. For example, the urgent event signal may be mapped to some of the radio resources belonging to the second reserved region. For example, the urgent event signal may be mapped to some top radio resources (may referred to as, for example, symbols, slots, or the like) among the radio resources belonging to the second reserved region in the time axis direction. Therefore, the radio terminal 10 may detect the urgent event at earlier time.

In FIG. 8, a gap corresponding to one subframe is present between the second reserved region and the first reserved region. The radio terminal 10 may execute a process of detecting the urgent event signal from the radio resources belonging to the second reserved region within a period of the gap between the second reserved region and the first reserved region. The time length of the period of the gap may be longer than one subframe or may be 0. When the period of the gap is 0, the radio terminal 10 may execute the process of detecting the urgent event signal within a time period of the second reserved region. For example, the second reserved region and the first reserved region may be adjacent to each other in the time axis direction.

Return to the description of FIG. 7. When the radio terminal 10 determines that the urgent event has been detected in S105 (YES in S105), the radio terminal 10 releases the radio resource belonging to the first reserved region from the resource pool for the V2X communication (S106). As a result, the radio resource belonging to the first reserved region is excluded from the selection targets for the V2X communication. For example, when the radio terminal 10 that is not in the urgent mode has already selected, as a radio resource for the V2X communication, the radio resource belonging to the first reserved region, and the urgent event is detected, the radio terminal 10 may be controlled such that the radio terminal 10 does not use the radio resource for the V2X communication.

The radio terminal 10 determines whether or not a radio resource is selectable from the resource pool after the release by S106 (S107). In S107, when a radio resource that belongs to a region other than the first reserved region and is available for the V2X communication is present in the resource pool, the radio terminal 10 may determine that the radio resource is selectable (YES in S107). On the other hand, in S107, when the radio resource available for the V2X communication is not present in the resource pool, the radio terminal 10 may determine that the radio resource is not selectable (NO in step S107).

When the radio terminal 10 determines that the radio resource is selectable from the resource pool after the release by S106 in S107 (YES in S107), the radio terminal 10 selects the radio resource from the resource pool (S108) and uses the selected radio resource to execute the V2X communication (S104). Therefore, when the urgent event is detected, the radio resource belonging to the first reserved region is removed from the selection targets for the V2X communication for the radio terminal 10 that is not in the urgent mode, and a radio resource belonging to a region other than the first reserved region is used for the V2X communication in the radio terminal 10 that is not in the urgent mode.

On the other hand, when the radio terminal 10 determines that the radio resource is not selectable from the resource pool after the release by S106 in S107 (NO in S107), the radio terminal 10 may stop the V2X communication within the second time window. The radio terminal 10 may execute the process of S101 and the subsequent processes or execute the process of S105 and the subsequent processes with a timing, as a trigger, of arrival the next second window.

When the radio terminal 10 determines that the urgent event has not been detected in S105 (NO in S105), the radio terminal 10 does not execute the resource pool release process (S106), selects the radio resource from the resource pool (S108), and uses the selected radio resource to execute the V2X communication (S104). Therefore, when the urgent event is not detected, the radio resource belonging to the first reserved region may be a selection target for the V2X communication for the radio terminal 10 that is not in the urgent mode.

The foregoing is an example of the process procedure by the radio terminal 10 according to Embodiment 1. The process procedure illustrated in FIG. 7 is an example, and the order that each of the processes is executed and the order that another one of the processes is executed may be switched to each other. The example of the process procedure illustrated in FIG. 7 is some exemplified processes included in processes by the radio terminal 10 according to Embodiment 1. The radio terminal 10 may execute another process, as well as the process procedure illustrated in FIG. 7.

According to an aspect of Embodiment 1 disclosed above, the second radio terminal (may also referred to as the radio terminal in the urgent mode) in which a packet to be transmitted by the V2X communication includes urgent information outputs an urgent event to cause the radio resource belonging to the first reserved region to be released from the resource pool of the other radio terminal (may also referred to as the radio terminal that is not in the urgent mode). Therefore, the second radio terminal may execute the V2X communication using the radio resource belonging to the first reserved region. Therefore, it may be possible to effectively suppress a delay in the V2X communication.

According to another aspect of Embodiment 1 disclosed above, when the second radio terminal in which the packet to be transmitted by the V2X communication includes the urgent information is not present, the radio terminal that is not in the urgent mode may use the radio resource belonging to the first reserved region. Therefore, it may be possible to suppress a reduction in the efficiency of using a radio resource for the V2X communication and effectively suppress a delay in the V2X communication.

Embodiment 2

In Embodiment 2, a first reserved region is configured to include a plurality of first divided regions, and a second reserved region is configured to include a plurality of second divided regions. Each of the plurality of first divided regions is corresponded to a respective one of the plurality of second divided regions. According to an aspect of Embodiment 2, a radio terminals 10 may be configured to use any of the plurality of second divided regions to output a signal (may also referred to as an urgent event signal) composed of a predetermined signal sequence indicating an urgent event when the radio terminal 10 is in the urgent mode. According to another aspect of Embodiment 2, the radio terminals 10 may be configured to determine whether or not a signal (may also referred to as an urgent event signal) composed of a predetermined signal sequence indicating an urgent event has been detected in each of the plurality of second divided regions, and remove, from selection targets for the V2X communication, a radio resource belonging to a first divided region corresponded to a second divided region in which the urgent event signal has been detected when the radio terminal 10 is not in the urgent mode.

Figure 9:
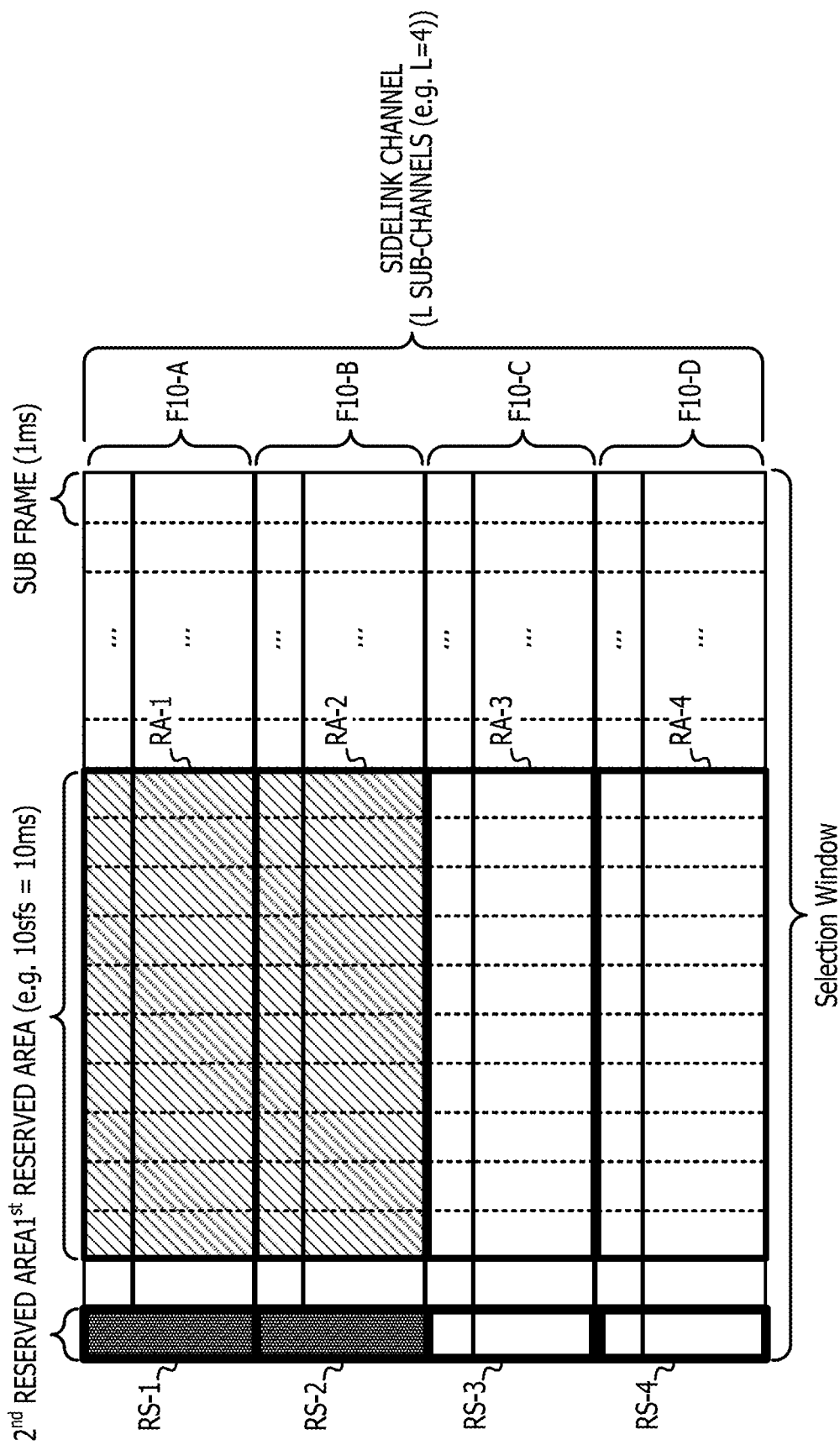
FIG. 9 is a diagram illustrating a first reserved region and a second reserved region in a second time window of a sidelink channel according to Embodiment 2.

FIG. 9 is a diagram illustrating an example of a first reserved region and a second reserved region in a second time window of a sidelink channel according to Embodiment 2. The first reserved region ($1^{st}$ reserved area) illustrated in FIG. 9 includes four first divided regions (RA-1, RA-2, RA-3, and RA-4) in a frequency axis direction. The second reserved region ($2^{nd}$ reserved area) illustrated in FIG. 9 includes four second divided regions (RS-1, RS-2, RS-3, and RS-4) in the frequency axis direction. Each of the four first divided regions (RA-1, RA-2, RA-3, and RA-4) is corresponded to a respective one of the four second divided regions (RS-1, RS-2, RS-3, and RS-4). In the example of FIG. 9, the first divided region (RA-1) and the second divided region (RS-1) belong to the same sub-channel (F10-A) and have an association relationship. For example, the first divided region (RA-1) is associated with the second divided region (RS-1). Similarly, the first divided region (RA-2) is associated with the second divided region (RS-2). The first divided region (RA-3) is associated with the second divided region (RS-3). The first divided region (RA-4) is associated with the second divided region (RS-4). For example, the first divided region (RA-2) and the second divided region (RS-2) belong to the same sub-channel (F10-B). The first divided region (RA-3) and the second divided region (RS-3) belong to the same sub-channel (F10-C). The first divided region (RA-4) and the second divided region (RS-4) belong to the same sub-channel (F10-D).

As illustrated in FIG. 9, the urgent event signal may be mapped to any of the plurality of second divided regions (RS-1 to RS-4). In the example of FIG. 9, the urgent event signal is mapped to the second divided region (RS-1) belonging to the sub-channel (F10-A) and the second divided region (RS-2) belonging to the sub-channel (F10-B). For example, in the example of FIG. 9, the urgent event signal is not mapped to the second divided region (RS-3) belonging to the sub-channel (F10-C) and the second divided region (RS-4) belonging to the sub-channel (F10-D).

As illustrated in FIG. 9, a radio resource is released from a resource pool for only a first divided region corresponded to a second divided region to which the urgent event signal is mapped. In the example of FIG. 9, radio resources are released from the resource pool for the first divided regions (RA-1 and RA-2) corresponded to the respective second divided regions (RS-1 and RS-2) to which the urgent event signal is mapped. For example, in the example of FIG. 9, a radio resource is not released from the resource pool for the first divided regions (RA-3 and RA-4) corresponded to the respective second divided regions (RS-3 and RS-4) to which the urgent event signal is not mapped.

Figure 10:
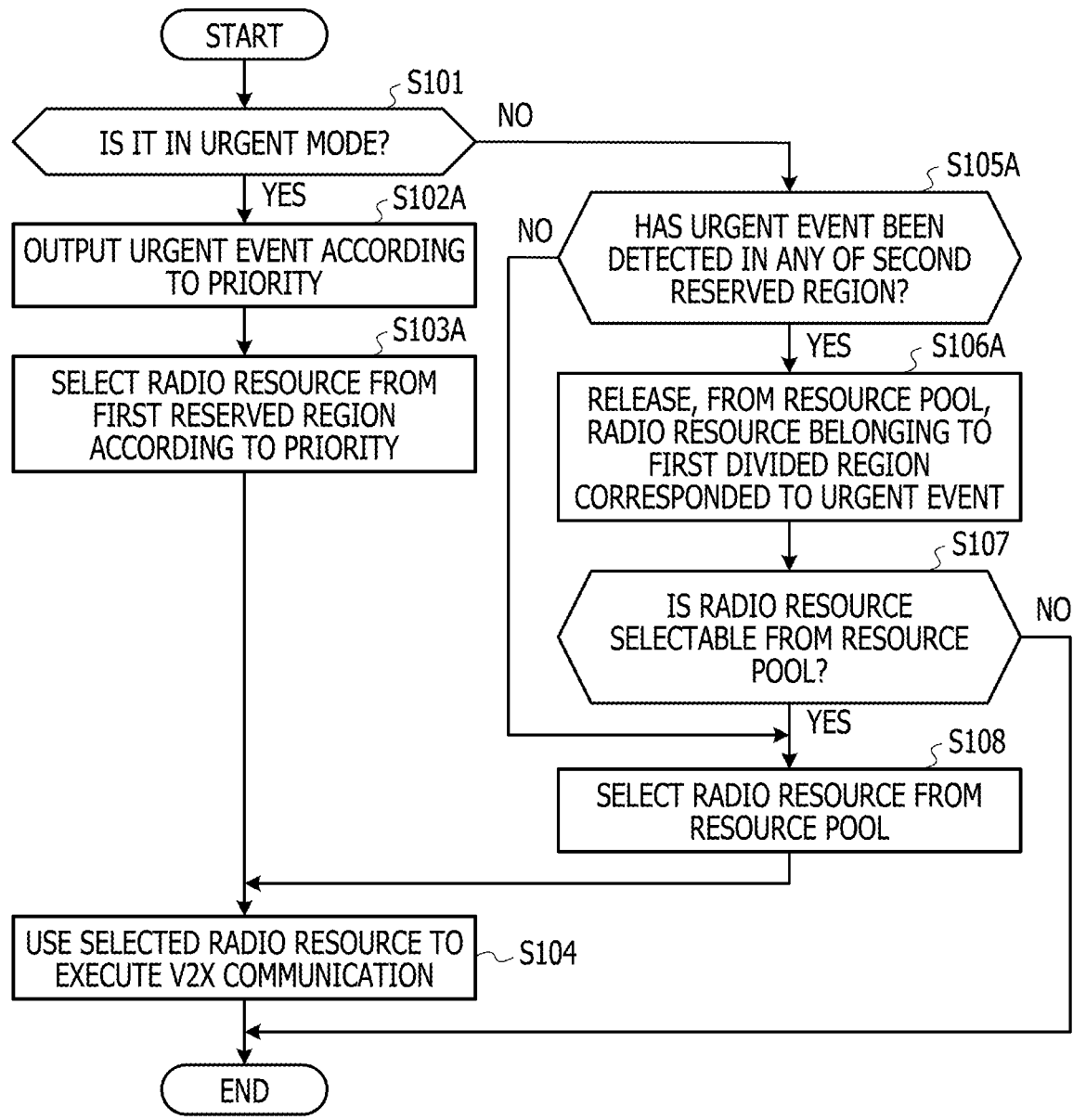
FIG. 10 is a diagram illustrating an example of a process procedure by each of radio terminals according to Embodiment 2.

FIG. 10 is a diagram illustrating an example of a process procedure by the radio terminal according to Embodiment 2. The example of the process procedure illustrated in FIG. 10 may be, for example, executed with a timing, as a trigger, of generation a packet to be transmitted in the V2X communication. The example of the process procedure illustrated in FIG. 10 may be, for example, executed with a timing, as a trigger, of arrival a start point of the second time window (may also referred to as a selection window) when the packet to be transmitted in the V2X communication is present in a buffer. These are examples of the trigger when the process procedure illustrated in FIG. 10 is executed. The process procedure illustrated in FIG. 10 may be executed at other timing. In FIG. 10, the same reference signs are added to the same processes as the process procedure illustrated in FIG. 7 and to be executed by the radio terminal according to Embodiment 1.

When the radio terminal 10 determines that the radio terminal 10 is in the urgent mode (YES in S101), the radio terminal 10 outputs an urgent event according to a priority (S102A). In S102A, the radio terminal 10 may determine the priority according to, for example, the length (may also referred to as a packet length or a data length) of the packet including urgent information. For example, the radio terminal 10 may determine the priority such that the priority becomes higher as the packet length becomes longer. Alternatively, the radio terminal 10 may determine the priority based on priority information set in the packet. Alternatively, the radio terminal 10 may determine the priority based on the priority information stored in a memory in advance. A range of the priority may be defined such that the range of the priority corresponds to the number of first divided regions or the number of second divided regions. For example, when the number of second divided regions is 4, the range of priority may be 0 to 3. For example, the maximum value of the priority may be defined such that the maximum value of the priority corresponds to the number of first divided regions or the number of second divided regions. For example, when the number of second divided regions is 4, the maximum value of the priority may be a value of "3" obtained by subtracting "1" from "the number of second divided regions".

In S102A, the radio terminal 10 may select, according to the value of the priority, a second divided region to which the urgent event signal is mapped. For example, when the priority is "0", the radio terminal 10 may map the urgent event signal to the one second divided region (RS-1). For example, when the priority is "1", the radio terminal 10 may map the urgent event signal to two the second divided regions (RS-1 and RS-2). For example, when the priority is "2", the radio terminal 10 may map the urgent event signal to three the second divided regions (RS-1, RS-2, and RS-3). For example, when the priority is "3", the radio terminal 10 may map the urgent event signal to four the second divided regions (RS-1, RS-2, RS-3, and RS-4). In this manner, the number of second divided regions to be selected may be increased and reduced according to the value of the priority. Alternatively, the radio terminal 10 may change, according to the value of the priority, the position of a second divided region to be selected, while the number of second divided regions to be selected may be fixed. For example, when the priority is "0", only the second divided region (RS-1) may be selected. For example, when the priority is "1", only the second divided region (RS-2) may be selected. For example, when the priority is "2", only the second divided region (RS-3) may be selected. For example, when the priority is "3", only the second divided region (RS-4) may be selected.

The radio terminal 10 selects, from a first divided region according to the priority, a radio resource to be used for the V2X communication (S103A). In S103A, the radio terminal 10 may select, for example, a first divided region corresponded to a second divided region selected according to the priority in S102A. In the example of FIG. 9, two the second divided regions (RS-1 and RS-2) are selected according to the priority, and the radio terminal 10 may select a radio resource for the V2X communication from radio resources belonging to the first divided regions (RA-1 and RA-2) corresponded to the selected second divided regions (RS-1 and RS-2). For example, the radio terminal 10 may not select a radio resource for the V2X communication from radio resources belonging to the first divided regions (RA-3 and RA-4) corresponded to the second divided regions (RS-3 and RS-4) that has not been selected according to the priority.

The radio terminal 10 uses the selected radio resource to execute the V2X communication (S104). Therefore, the radio terminal 10 may execute the V2X communication using any of radio resources belonging to a range of a first divided region adjusted according to the level of the priority.

On the other hand, when the radio terminal 10 determines that the radio terminal 10 is not in the urgent mode (NO in S101), the radio terminal 10 determines whether or not an urgent event has been detected in any of the plurality of second divided regions (S105A). The radio terminal 10 may be configured to execute the process (S105A) of determining whether or not the urgent event has been detected when a predetermined flag stored in the memory is set to OFF.

In S105A, the radio terminal 10 may monitor each of the plurality of second divided regions and determine whether or not an urgent event signal has been detected in each of the plurality of second divided regions.

When the radio terminal 10 determines that the urgent event has been detected in any of the plurality of second divided regions (YES in S105A), the radio terminal 10 releases a radio resource belonging to a first divided region corresponded to the urgent event from the resource pool (S106A). In S106A, for example, the radio terminal 10 may release, from the resource pool for the V2X communication, the radio resource belonging to the first divided region corresponded to the second divided region in which the urgent event signal has been detected in S105A.

According to the example of FIG. 9, the radio terminal 10 may detect the urgent event signal in two the second divided regions (RS-1 and RS-2) and release, from the resource pool for the V2X communication, a radio resource belonging to the first divided region (RA-1) corresponded to the second divided region (RS-1) and a radio resource belonging to the first divided region (RA-2) corresponded to the second divided region (RS-2).

The radio terminal 10 determines whether or not a radio resource is selectable from the resource pool after the release by S106A (S107). When the radio terminal 10 determines that the radio resource is selectable from the resource pool after the release by S106 in S107 (YES in S107), the radio terminal 10 selects the radio resource from the resource pool (S108) and uses the selected radio resource to execute the V2X communication (S104). Therefore, when the urgent event is detected, a radio resource belonging to a first divided region corresponded to a second divided region in which the urgent event has been detected may be removed from the selection targets for the V2X communication for the radio terminal 10 that is not in the urgent mode, and a radio resource belonging to a region other than the first divided region may be used for the V2X communication in the radio terminal 10 that is not in the urgent mode.

On the other hand, when the radio terminal 10 determines that the radio resource is not selectable from the resource pool after the release by S106A in S107 (NO in S107), the radio terminal 10 may stop the V2X communication in the second time window. The radio terminal 10 may execute the process of S101 and the subsequent processes or execute the process of S105A and the subsequent processes with a timing, as a trigger, of arrival of the next second windows.

When the radio terminal 10 determines that the urgent event has not been detected in S105A (NO in S105A), the radio terminal 10 does not execute the release from the resource pool in S106A, selects a radio resource from the resource pool (S108), and uses the selected radio resource to execute the V2X communication (S104). Therefore, when the urgent event is not detected, radio resources belonging to the first divided regions may be selection targets for the V2X communication for the radio terminal 10 that is not in the urgent mode. Even when the urgent event is not detected, radio resources belonging to the second divided regions may be removed from the selection targets for the V2X communication.

The foregoing is the example of the process procedure by the radio terminal 10 according to Embodiment 2. The process procedure illustrated in FIG. 10 is an example, and the order that each of the processes is executed and the order that another one of the processes is executed may be switched to each other. The example of the process procedure illustrated in FIG. 10 is some exemplified processes included in processes by the radio terminal 10 according to Embodiment 2. the radio terminal 10 may execute another process, as well as the process procedure illustrated in FIG. 10.

According to an aspect of Embodiment 2 disclosed above, the first reserved region and the second reserved region are divided into the plurality of first divided regions and the plurality of second divided regions, respectively. A second radio terminal (may also referred to as a radio terminal in the urgent mode or second radio terminal) in which a packet to be transmitted by the V2X communication includes urgent information outputs an urgent event according to the priority to cause a radio resource belonging to a first divided region corresponded to the urgent event to be released from the resource pool of the other radio terminal (may also referred to as a radio terminal that is not in the urgent mode or first radio terminal). Therefore, the second radio terminal may execute the V2X communication using the radio resource belonging to the first divided region. For example, in the wireless communication system 1 according to Embodiment 2, the amount of a radio resource to be released by the first radio terminal is controlled based on the priority of the second radio terminal. Therefore, it may be possible to effectively suppress a delay in the V2X communication by the radio terminal in the urgent mode and suppress a reduction in the efficiency of using a radio resource for the V2X communication. Eventually, even a delay in the V2X communication by the radio terminal that is not in the urgent mode may be effectively suppressed by suppressing a reduction in the efficiency of using a radio resource for the V2X communication.

According to another aspect of Embodiment 2 disclosed above, when the second radio terminal in which the packet to be transmitted by the V2X communication includes the urgent information is not present, the radio terminal that is not in the urgent mode may use radio resources belonging to the first reserved region including the plurality of first divided regions. Therefore, it may be possible to suppress a reduction in the efficiency of using a radio resource for the V2X communication and effectively suppress a delay in the V2X communication.

Embodiment 3

In Embodiment 3, a time range to which an urgent event is assigned is extended in a sidelink channel for the V2X communication. According to an aspect of Embodiment 3, a radio terminal 10 may be configured to, upon detecting an urgent event, not only release, from a resource pool for the V2X communication, a radio resource belonging to a first reserved region in a second time window in which the urgent event has been detected, but also release, from the resource pool for the V2X communication, radio resources belonging to first reserved regions in a plurality of second time windows from the time of the detection of the urgent event to the time when a predetermined time period elapses. For example, a radio resource belonging to a first reserved region is continuously removed from selection targets in one or more second time windows included in the time period from the time of the detection of the urgent event to the time when the predetermined time period elapses. According to another aspect of Embodiment 3, the radio terminal 10 may be configured to execute the V2X communication using a radio resource belonging to a first reserved region in a second time window in which an urgent event is output when the radio terminal 10 is in the urgent mode. According to another aspect of Embodiment 3, the radio terminal 10 may be configured to execute the V2X communication using radio resources belonging to first reserved regions in the plurality of second time windows from the time of the output of the urgent event to the time when the predetermined time period elapses.

FIG. 11 is a diagram illustrating an example of a time range to which an urgent event is assigned in the sidelink channel according to Embodiment 3. In FIG. 11, five second time windows (W-10, W-20, W-30, W-40, and W-50) in the sidelink channel for the V2X communication are illustrated and time progresses from left to right.

In FIG. 11, an urgent event is not output in the second time window (W-10), which is first from the left end. Therefore, a radio resource belonging to a first reserved region (RA-10) in the second time window (W-10) may be used by a radio terminal (may also referred to as a first radio terminal) that is not in the urgent mode. For example, the radio resource belonging to the first reserved region (RA-10) in the second time window (W-10) may not be used by a radio terminal (may also referred to as a second radio terminal) in the urgent mode.

In FIG. 11, an urgent event (RS-20) is output in the second time window (W-20), which is second from the left end. Therefore, a radio resource belonging to a first reserved region (RA-20) in the second time window (W-20) is released from the resource pool of the radio terminal (may also referred to as a first radio terminal) that is not in the urgent mode. For example, the first radio terminal does not use the radio resource belonging to the first reserved region (RA-20) in the second time window (W-20). For example, the second radio terminal may use the radio resource belonging to the first reserved region (RA-20) in the second time window (W-20).

In FIG. 11, the urgent event is not output in the second time window (W-30), which is third from the left end and the second time window (W-40), which is fourth from the left end. However, the urgent event (RS-20) output in the second time window (W-20) is assigned to the second time window (W-30) and the second time window (W-40). For example, in the example of FIG. 11, the second time window (W-30) and the second time window (W-40) are an example of a time period from the time of the output of the urgent event to the time when a predetermined time period elapses. For example, the first radio terminal releases (removes), from the resource pool for the V2X communication, radio resources belonging to the first reserved regions (RA-30 and RA-40) included in the respective second time windows (W-30 and W-40) included in a predetermined time period from the second time window (W-20) in which the urgent event (RS-20) is output. For example, the second radio terminal executes the V2X communication using the radio resources belonging to the first reserved regions (RA-30 and RA-40) included in the respective second time windows (W-30 and W-40) included in the predetermined time period from the second time window (W-20) in which the urgent event (RS-20) is output.

In FIG. 11, the urgent event is not output in the second time window (W-50), which is fifth from the left end, like the second time window (W-30), which is third from the left end and the second time window (W-40), which is fourth from the left end. However, the urgent event (RS-20) output in the second time window (W-20) is not assigned to the second time window (W-50). For example, in the example of FIG. 11, the second time window (W-50) is an example of a second time window after the time period from the time when the urgent event is output to the time when the predetermined time period elapses. A radio resource belonging to a first reserved region (RA-50) in the second time window (W-50) may be used by the first radio terminal. For example, the radio resource belonging to the first reserved region (RA-50) in the second time window (W-50) may not be used by the second radio terminal.

Figure 12A:
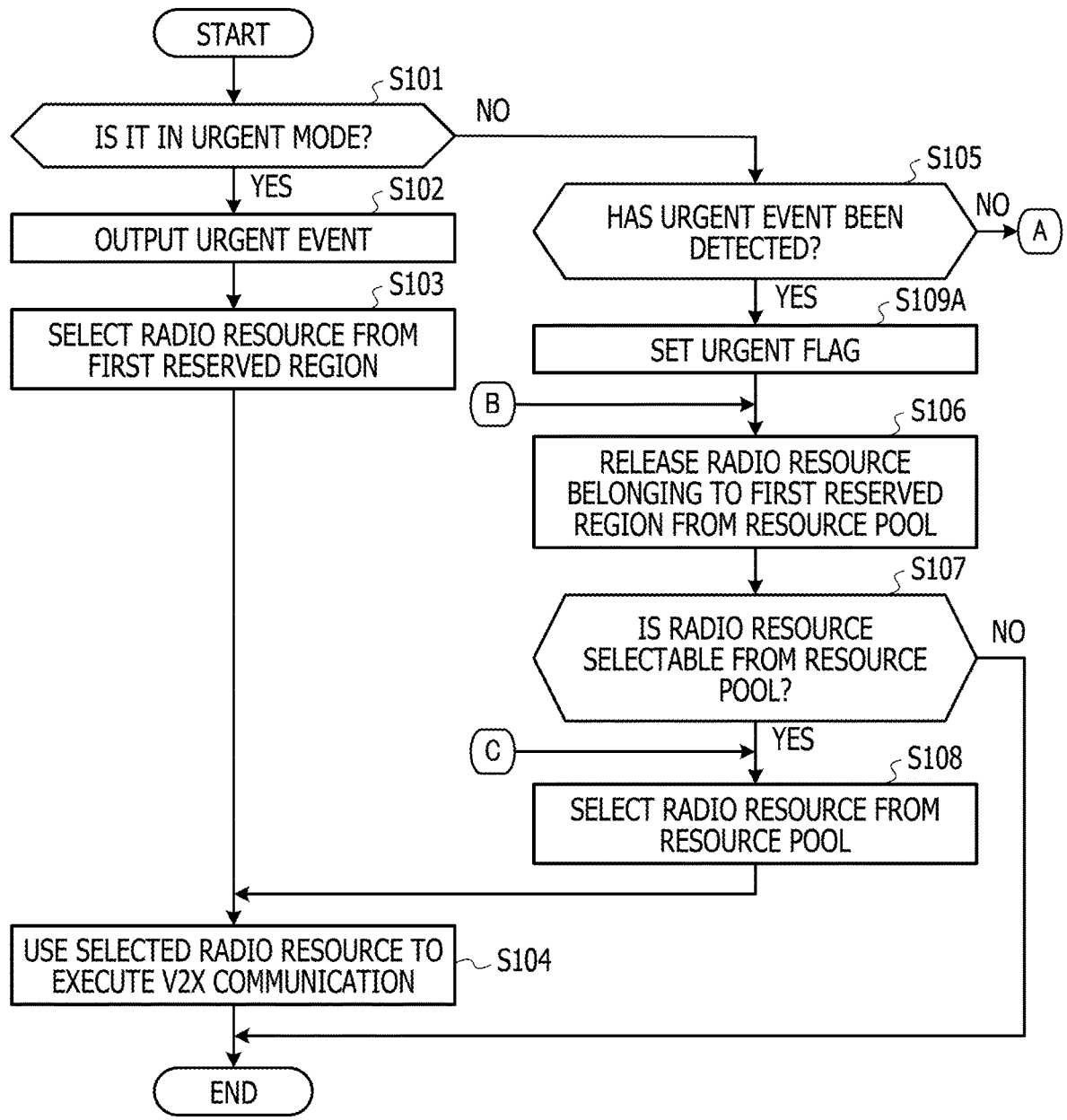
FIG. 12A is a first diagram illustrating an example of a process procedure by each of radio terminals according to Embodiment 3.
Figure 12B:
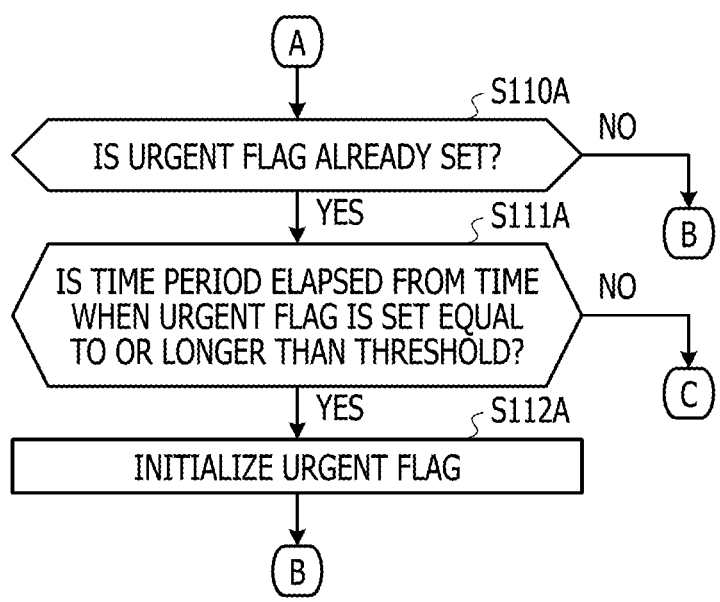
FIG. 12B is a second diagram illustrating the example of the process procedure by the radio terminal according to Embodiment 3.

FIGS. 12A and 12B are diagrams illustrating an example of a process procedure by the radio terminal 10 according to Embodiment 3. The example of the process procedure illustrated in FIGS. 12A and 12B may be, for example, executed with a timing, as a trigger, of generation a packet to be transmitted in the V2X communication. The example of the process procedure illustrated in FIGS. 12A and 12B may be, for example, executed with a timing of arrival a start point of second time window when the packet to be transmitted in the V2X communication is present in a buffer. These are examples of the trigger when the process procedure illustrated in FIGS. 12A and 12B is executed. The process procedure illustrated in FIGS. 12A and 12B may be executed at other timing. In FIG. 12, the same reference signs are added to the same processes as the process procedure illustrated in FIG. 7 and to be executed by the radio terminal according to Embodiment 1.

In the process procedure illustrated in FIG. 12A, the radio terminal 10 may execute each of processes indicated by S101 to S105 in the same manner as FIG. 7. The processes indicated by S101 to S105 in FIG. 12A are the same as the processes indicated by S101 to S105 in FIG. 7, respectively, and will not be described in detail. The radio terminal 10 may omit the output of the urgent event in S102 and execute S103 until a time period elapsed from the output of the urgent event by the previous execution of S102 becomes equal to or longer than a threshold. In S102, the radio terminal 10 may measure the time period elapsed from the output of the urgent event by a timer. Alternatively, the radio terminal 10 may store, in its memory, information indicating the time (may also referred to as output time) when the urgent event is output in S102. The radio terminal 10 may acquire the elapsed time period by calculating the difference between the current time and the output time every time the radio terminal 10 executes S102.

When the radio terminal 10 determines that the radio terminal 10 has detected the urgent event in S105 (YES in S105), the radio terminal 10 sets an urgent flag indicating that the urgent event has been detected (S109A). The urgent flag may be used to determine whether or not the urgent event has been detected in a time period from a time point earlier by a predetermined time period than the time when the process procedure illustrated in FIG. 12A is executed. For example, the radio terminal 10 may secure, in the memory, a one-bit storage region for the urgent flag, and may set a value of "1" in the storage region for the urgent flag in S109A. It is assumed that the value of the urgent flag is held even after the process procedure illustrated in FIGS. 12A and 12B is terminated, unless the value of the urgent flag is initialized.

In S109A, the radio terminal 10 may store, in the memory, the time when the urgent event has been detected. Alternatively, in S109A, the radio terminal 10 may start measurement by a timer for counting a time period elapsed from the time when the urgent flag is set.

The radio terminal 10 releases a radio resource belonging to a first reserved region from the resource pool for the V2X communication (S106). As a result, the radio resource belonging to the first reserved region is removed from the selection targets for the V2X communication. For example, when the radio terminal 10 that is not in the urgent mode has already selected, as a radio resource for the V2X communication, the radio resource belonging to the first reserved region, and the urgent event is detected, the radio terminal 10 may be controlled such that the radio terminal 10 does not use the radio resource for the V2X communication.

The radio terminal 10 determines whether or not a radio resource is selectable from the resource pool after the release by S106 (S107). In S107, when a radio resource that belongs to a region other than the first reserved region and is available for the V2X communication is present in the resource pool, the radio terminal 10 may determine that the radio resource is selectable (YES in S107). On the other hand, in S107, when the radio resource available for the V2X communication is not present in the resource pool, the radio terminal 10 may determine that the radio resource is not selectable (NO in step S107).

When the radio terminal 10 determines that the radio resource is selectable from the resource pool after the release by S106 in S107 (YES in S107), the radio terminal 10 selects the radio resource from the resource pool (S108) and uses the selected radio resource to execute the V2X communication (S104). Therefore, when the urgent event is detected, the radio resource belonging to the first reserved region is removed from the selection targets for the V2X communication for the radio terminal 10 that is not in the urgent mode, and a radio resource belonging to a region other than the first reserved region is used for the V2X communication in the radio terminal 10 that is not in the urgent mode.

On the other hand, when the radio terminal 10 determines that the radio resource is not selectable from the resource pool after the release by S106 in S107 (NO in S107), the radio terminal 10 may stop the V2X communication within the second time window. The radio terminal 10 may execute the process of S101 and the subsequent processes or execute the process of S105 and the subsequent processes with a timing, as a trigger, of arrival the next second time window.

When the radio terminal 10 determines that the urgent event has not been detected in S105 (NO in S105), the radio terminal 10 determines whether or not the urgent flag indicating that the urgent event has been detected is already set (S110A). Note that, a reference sign "A" illustrated in FIG. 12A as a transition destination when the answer to S105 is NO indicates a reference sign "A" illustrated in FIG. 12B.

For example, when the radio terminal 10 references the storage region secured for the urgent flag in the memory, and the value of "1" is stored in the storage region for the urgent flag, the radio terminal 10 may determine that the urgent flag indicating that the urgent event has been detected is already set in S110A (YES in S110A). On the other hand, when a value of "0" is stored in the storage region secured for the urgent flag in the memory, the radio terminal 10 may determine that the urgent flag indicating that the urgent event has been detected is not set in S110A (NO in S110A).

When the radio terminal 10 determines that the urgent flag is already set (YES in S110A), the radio terminal 10 determines whether or not a time period elapsed from the time when the urgent flag is set is equal to or longer than a threshold (S111A). In S111A, for example, the radio terminal 10 may reference the memory, acquire information indicating the time (may also referred to as detection time) when the urgent event has been detected, and calculate the difference between the current time and the detection time, thereby acquiring the elapsed time period. Alternatively, in S111A, for example, the radio terminal 10 may acquire a timer value measured by the timer for counting a time period elapsed from the time when the urgent flag is set, thereby acquiring the elapsed time period.

When the time period elapsed from the time when the urgent flag is set is equal to or longer than the threshold (YES in S111A), the radio terminal 10 initializes the urgent flag (S112A). In S112A, for example, the radio terminal 10 may set the value of "0" in the storage region secured for the urgent flag in the memory, thereby initializing the urgent flag.

When the time period elapsed from the time at which the urgent flag is set is equal to or longer than the threshold (YES in S111A), the radio terminal 10 selects a radio resource from the resource pool (S108) and uses the selected radio resource to execute the V2X communication (S104). Therefore, when the predetermined time period elapses from the time of the detection of the urgent event, the radio resource belonging to the first reserved region is also included in the selection targets for the V2X communication for the radio terminal 10 that is not in the urgent mode. Note that, a reference sign "B" illustrated in FIG. 12B as a transition destination after the answer to S111A is determined to be "YES" indicates a reference sign "B" illustrated in FIG. 12A.

On the other hand, when the radio terminal 10 determines that the time period elapsed from the time when the urgent flag is set is shorter than the threshold in S111A (NO in S111A), the radio terminal 10 releases the radio resource belonging to the first reserved region from the resource pool for the V2X communication (S106). As a result, the time range to which the urgent event is assigned is extended. For example, the radio resource belonging to the first reserved region is removed from the selection targets for the V2X communication. For example, when the radio terminal 10 that is not in the urgent mode has already selected, as a radio resource for the V2X communication, the radio resource belonging to the first reserved region, and the urgent event is detected, the radio terminal 10 that is not in the urgent mode may be controlled such that the radio terminal 10 does not use the radio resources for the V2X communication. Note that, a reference sign "C" illustrated in FIG. 12B as a transition destination after the answer to S111A is determined to be "NO" indicates a reference sign "C" illustrated in FIG. 12A.

The radio terminal 10 determines whether or not a radio resource is selectable from the resource pool after the release by S106 (S107). When the radio terminal 10 determines that the radio resource is selectable from the resource pool after the release by S106 in S107 (YES in S107), the radio terminal 10 selects the radio resource from the resource pool (S108) and uses the selected radio resource to execute the V2X communication (S104). Therefore, the radio resource belonging to the first reserved region is removed from the selection targets for the V2X communication for the radio terminal 10 that is not in the urgent mode, and a radio resource belonging to a region other than the first reserved region is used for the V2X communication in the radio terminal 10 that is not in the urgent mode.

On the other hand, when the radio terminal 10 determines that the radio resource is not selectable from the resource pool after the release by S106 in S107 (NO in S107), the radio terminal 10 may stop the V2X communication within the second time window. The radio terminal 10 may execute the process of S101 and the subsequent processes or execute the process of S105 and the subsequent processes with a timing, as a trigger, of arrival the next second time window.

When the radio terminal 10 determines that the urgent flag indicating that the urgent event has been detected is not set in S110A (NO in S110A), the radio terminal 10 selects the radio resource from the resource pool (S108) and uses the selected radio resource to execute the V2X communication (S104). Therefore, the radio resource belonging to the first reserved region is also included in the selection targets for the V2X communication for the radio terminal 10 that is not in the urgent mode. Note that, the reference sign "B" illustrated in FIG. 12B as a transition destination after the answer to S110A is "NO" indicates the reference sign "B" illustrated in FIG. 12A.

The foregoing is an example of the process procedure by the radio terminal 10 according to Embodiment 3. The process procedure illustrated in FIGS. 12A and 12B is an example, and the order that each of the processes is executed and the order that another one of the processes is executed may be switched to each other. The example of the process procedure illustrated in FIGS. 12A and 12B is some exemplified processes included in processes by the radio terminal 10 according to Embodiment 3. The radio terminal 10 may execute another process, as well as the process procedure illustrated in FIGS. 12A and 12B.

According to an aspect of Embodiment 3 disclosed above, the radio terminal 10 releases, upon detecting an urgent event, a radio resource belonging to a first reserved region in a second time window in which the urgent event has been detected, from the resource pool for the V2X communication. According to the aspect of Embodiment 3, the radio terminal 10 releases (removes), from the resource pool for the V2X communication, radio resources belonging to first reserved regions in a plurality of second time windows from the time when the urgent event is detected to the time when the predetermined time period elapses. Therefore, the radio terminal (may also referred to as the first radio terminal) that is not in the urgent mode may not execute the process of detecting the urgent event in the plurality of second time windows from the time at which the urgent event is detected to the time at which the predetermined time period elapses. As a result, the first radio terminal may save power that may be consumed by the first radio terminal when the first radio terminal executes the process of detecting the urgent event. Therefore, the first radio terminal may increase a time period for driving by a battery and effectively execute the V2X communication, while effectively suppressing a delay in the V2X communication.

According to another aspect of Embodiment 3 disclosed above, when the radio terminal (may also referred to as the second radio terminal) is in the urgent mode, the radio terminal may use, for the V2X communication, a radio resource belonging to a first reserved region in a second time window in which an urgent event is output. According to the other aspect of Embodiment 3, the second radio terminal may omit the output of the urgent event and use, for the V2X communication, radio resources belonging to first reserved regions in a plurality of second time windows included in a time period from the output of the urgent event to the time at which a time period elapsed from the output of the urgent event becomes equal to or longer than a threshold. As a result, the second radio terminal may save power that may be consumed by the second radio terminal when the second radio terminal executes the process of outputting the urgent event in the plurality of second time windows included in the time period from the output of the urgent event to the time when the time period elapsed from the output of the urgent event becomes equal to or longer than the threshold. Therefore, the second radio terminal may increase a time period for driving by a battery and effectively execute the V2X communication, while effectively suppressing a delay in the V2X communication.

According to still another aspect of Embodiment 3 disclosed above, when the second radio terminal in which a packet to be transmitted by the V2X communication includes urgent information is not present, the first radio terminal that is not in the urgent mode may use the radio resource belonging to the first reserved region. Therefore, it may be possible to suppress a reduction in the efficiency of using a radio resource for the V2X communication and effectively suppress a delay in the V2X communication.

<Hardware Configuration>

Lastly, hardware configurations of the radio terminals 10 used in each of the embodiments disclosed above and a hardware configuration of the radio base station 20 used in each of the embodiments disclosed above are briefly described.

FIG. 13 is a diagram illustrating an example of the hardware configuration of the radio terminals (UEs) 10 included in the wireless communication system 1 and the hardware configuration of the radio base station (eNB/gNB) 20 included in the wireless communication system 1. Note that each of the radio terminals 10-1 and 10-2 illustrated in FIG. 13 may be the foregoing first radio terminal or may be the second radio terminal.

The UEs 10 (for example, UE 10-1 and UE 10-2) illustrated in FIG. 13 includes a radio communication circuit 101 (may also referred to as a radio communication unit, a second radio communication unit, or a second radio communication circuit), a processing circuit 102 (may also referred to as a processing unit, a second processing unit, or a second processing circuit), a memory 103, and the like. In the UEs 10 illustrated in FIG. 13, illustrations of some configurations such as an antenna are omitted. The UEs 10 may include a display device, such as a liquid crystal display, an input device, such as a touch panel, a battery, such as a lithium-ion secondary battery (lithium-ion rechargeable battery), and the like. When the UEs 10 illustrated in FIG. 13 is configured to output an urgent event signal as a sound wave, the UE 10 may include a speaker, an alarming horn (may also referred to as a horn or a vehicle horn), a siren, a megaphone, or the like.

The radio communication circuit 101 is configured to receive supply of a baseband signal (may also referred to as a wireless signal or a digital wireless signal) from the processing circuit 102, generate a wireless signal (may also referred to as a second wireless signal or an analog wireless signal) of a predetermined output level from the baseband signal, and emit the wireless signal into a space via the antenna. Therefore, the UE 10 may transmit the wireless signal to the radio base station 20 or the other UE 10. For example, the UE 10-1 may transmit a V2X communication signal to the UE 10-2 by the radio communication circuit 101 of the UE 10-1. Similarly, the UE 10-2 may transmit a V2X communication signal to the UE 10-1 by the radio communication circuit 101 of the UE 10-2. The radio communication circuit 101 is configured to receive a wireless signal input from the antenna, convert the wireless signal into a baseband signal, and supply the baseband signal to the processing circuit 102. Therefore, the UE 10 may receive a wireless signal from the radio base station 20 or the other UE 10. For example, the UE 10-1 may receive a V2X communication signal from the UE 10-2 by the radio communication circuit 101 of the UE 10-1. Similarly, the UE 10-2 may receive a V2X communication signal from the UE 10-1 by the radio communication circuit 101 of the UE 10-2. As described above, the radio communication circuit 101 is configured to transmit and receive a wireless signal and has a function of executing wireless communication with the radio base station 20 or the other UE 10. For example, the radio terminal 10 may have implemented therein, as the radio communication circuit 101 illustrated in FIG. 13, a radio communication circuit 101 for wireless communication with the radio base station 20 and a radio communication circuit 101 for V2X communication with the other radio terminal 10.

The radio communication circuit 101 may be coupled to the processing circuit 102 via a transmitting circuit implemented in the UE 10 such that the radio communication circuit 101 may communicate with the processing circuit 102 via the transmitting circuit. As the transmitting circuit, for example, a transmitting circuit conforming to a standard, such as M-PHY or Dig-RF, may be used.

The processing circuit 102 (may also referred to as a processor circuit or an arithmetic circuit) is configured to execute a baseband signal process. The processing circuit 102 is configured to generate a baseband signal (may also referred to as a wireless signal or a digital wireless signal) based on a wireless communication protocol stack for the wireless communication system 1 and output the baseband signal to the radio communication circuit 101. For example, as the wireless communication protocol, an LTE wireless communication protocol or a 5G wireless communication protocol may be used. For example, as the wireless communication protocol, a wireless communication protocol for the V2X communication may be used. The processing circuit 102 is configured to execute reception processes, such as demodulation and decoding, on the baseband signal input from the radio communication circuit 101 based on the wireless communication protocol stack for the wireless communication system 1. For example, the processing circuit 102 has an aspect as a circuit that causes the radio communication circuit 101 to transmit, in an uplink, a wireless signal partially or fully based on second data obtained by sequentially processing first data to the radio base station 20 or the other UE 10 in accordance with a procedure for the wireless communication protocol stack obtained by dividing a wireless communication function into a plurality of layers in order from an upper layer to a lower layer. The processing circuit 102 has an aspect as a circuit that sequentially processes a wireless signal received via the radio communication circuit 101 in accordance with the procedure for the wireless communication protocol stack obtained by dividing the wireless communication function into the plurality of layers in order from the lower layer to the upper layer. The reception of input of the baseband signal via the transmitting circuit from the radio communication circuit 101 includes an aspect of receiving the wireless signal from the radio base station 20 or the other UE 10 via the radio communication circuit 101. The output of the baseband signal to the radio communication circuit 101 via the transmitting circuit includes an aspect of transmitting the wireless signal to the radio base station 20 or the other UE 10 via the radio communication circuit 101.

The processing circuit 102 may be, for example, an arithmetic device that reads and executes a program stored in the memory 103, thereby achieving an operation of the UE 10 (may also referred to as the radio terminal) according to each of the foregoing embodiments. For example, the processing circuit 102 has an aspect as a main body (may also referred to as an arithmetic device) that executes the process procedures in the operations (for example, the operations illustrated in FIGS. 7, 10, 12A, and 12B) of the radio terminal 10 according to each of the foregoing embodiments. As the processing circuit 102, for example, a central processing unit (CPU), a microprocessor unit (MPU), a digital signal processor (DSP), a field-programmable gate array (FPGA), or a combination thereof may be used. The processing circuit 102 may be a multicore processor including two or more cores. Regarding the processing circuit 102, two or more processing circuits 102 may be implemented based on each of the layers of the wireless communication protocol stack for the wireless communication system 1. For example, the radio terminal 10 may have implemented therein, as the processing circuit 102 illustrated in FIG. 13, a processing circuit 102 for wireless communication with the radio base station 20 and a processing circuit 102 for V2X communication with the other radio terminal 10.

The processing circuit 102 may be referred to as a C-CPU. Each of the UEs 10 may have implemented therein not only the processing circuit 102 but also a processor circuit that executes an application and may be also referred to as an A-CPU. The processing circuit 102 may be implemented as one chip with the processor circuit that may be also referred to as an A-CPU. The processing circuit 102 may be implemented as a chip separated from the A-CPU. The processing circuit 102 may have an aspect as a controller having a function of controlling an operation of the UE 10. The processing circuit 102 may have an aspect as a processing unit configured to cause the radio communication circuit 101 (may also referred to as a radio communication unit) to receive, from the radio base station 20, a first control message relating to a reconfiguration of radio coupling between the radio base station 20 and the radio terminal 10.

The memory 103 is a circuit configured to store and hold data and a program that relate to the baseband signal process to be executed by the processing circuit 102. The memory 103 is configured to include at least both or either one of a nonvolatile storage device and a volatile storage device. As the memory 103, for example, a random-access memory (RAM), a read-only memory (ROM), a solid-state drive (SSD), a hard disk drive (HDD), or the like may be used. In FIG. 13, the memory 103 is a collective term of various storage devices, such as main storage devices and auxiliary storage devices. Regarding the memory 103, two or more memories 103 may be implemented according to each of the layers of the wireless communication protocol stack for the wireless communication system 1 in the same manner as the processing circuit 102. For example, the radio terminal 10 may have implemented therein, as the memory 103 illustrated in FIG. 13, a memory 103 for wireless communication with the radio base station 20 and a memory 103 for V2X communication with the other radio terminal 10.

The radio base station 20 illustrated in FIG. 13 includes a radio communication circuit 201 (may also referred to as a radio communication unit, a first radio communication unit, or a first radio communication circuit), a processing circuit 202 (also referred to as a processing unit, a first processing unit, or a first processing circuit), a memory 203, and a wired communication circuit 204.

The radio communication circuit 201 is configured to receive a baseband signal from the processing circuit 202, generate a wireless signal of a predetermined output level from the baseband signal, and emit the wireless signal into a space via an antenna in a downlink. The radio communication circuit 201 is configured to receive a wireless signal input from the antenna, convert the wireless signal into a baseband signal, and supply the baseband signal to the processing circuit 202 in the uplink. The radio communication circuit 201 may also be coupled to the processing circuit 202 via a transmission path, such as a common public radio interface (CPRI), such that the radio communication circuit 201 may communicate with the processing circuit 202 via the transmission path. The radio communication circuit 201 may be also referred to as a remote radio head (RRH) or a remote radio equipment (RRE). A combination of the radio communication circuit 201 and the processing circuit 202 is not limited to a one-to-one relationship. A plurality of processing circuit 202 may be associated with one radio communication circuit 201. One processing circuit 202 may be corresponding to a plurality of radio communication circuits 201. A plurality of processing circuits 202 may be corresponding to a plurality of radio communication circuits 201. As described above, the radio communication circuit 201 has an aspect as a communication unit (may also referred to as a transceiver or a second transceiver) having a function of executing wireless communication with the UEs 10. For example, the radio communication circuit 201 may be configured to transmit, the radio terminal 10, the RRC message including the setting information on the configuration of the sidelink channel for the V2X communication. The setting information may include, for example, the setting information on the first reserved region according to the present disclosure. For example, the RRC message may include the setting information on the first reserved region according to the present disclosure. The setting information on the first reserved region may include, for example, information to be used by the radio terminals 10 to identify the position of the first reserved region and the size of the first reserved region.

The processing circuit 202 is configured to execute a baseband signal process. The processing circuit 202 is configured to generate a baseband signal based on the wireless communication protocol stack for the wireless communication system 1 and output the baseband signal to the radio communication circuit 201 in the downlink. The processing circuit 202 is configured to execute reception processes, such as demodulation and decoding, on a baseband signal input from the radio communication circuit 201 based on the wireless communication protocol stack for the wireless communication system 1 in the uplink. For example, the processing circuit 202 has an aspect as a circuit that sequentially processes the RRC message including the setting information on the configuration of the sidelink channel for the V2X communication in accordance with the procedure for the wireless communication protocol stack (for example, LTE or 5G wireless communication protocol stack) obtained by dividing the wireless communication function into the plurality of layers in order from the upper layer to the lower layer, and transmits the RRC message via the radio communication circuit 201 in the down link. The processing circuit 202 has an aspect as a circuit that sequentially processes a wireless signal received via the radio communication circuit 201 in the uplink in accordance with the wireless communication protocol stack obtained by dividing the wireless communication function into the plurality of layers in order from the lower layer to the upper layer. The reception of input of the baseband signal from the radio communication circuit 201 includes an aspect of receiving the wireless signal from the UE 10 via the radio communication circuit 201 in the uplink. Some of the functions of the processing circuit 202 may be implemented in the foregoing radio communication circuit 201. For example, the radio communication circuit 201 may have a function relating to a physical layer (also called layer 1) in the wireless communication protocol stack. For the allocation of the implementation relating to the processes of the layers (or sublayers) of the wireless communication protocol stack, design of the radio communication circuit 201 and the processing circuit 202 may be changed.

For example, the processing circuit 202 has an aspect as a main body (may also referred to as an arithmetic device) that executes the process procedures in the radio base station 20 by reading and executing a program stored in the memory 203. As the processing circuit 202, for example, a central processing unit (CPU), a microprocessor unit (MPU), a digital signal processor (DSP), a field-programmable gate array (FPGA), or the like may be used. The processing circuit 202 may be a multicore processor including two or more cores. Regarding the processing circuit 202, two or more processing circuits 202 may be implemented based on each of the layers of the wireless communication protocol stack for the wireless communication system 1. For example, a processing circuit 202 that executes a process as a MAC entity belonging to a MAC layer, a processing circuit 202 that executes a process as an RLC entity belonging to an RLC layer, and a processing circuit 202 that executes a process as a PDCP entity belonging to a PDCP layer may be individually implemented. As described above, the processing circuit 202 has an aspect as a controller (may also referred to as a second controller in order to distinguish from the controllers of the UEs 10) having a function of controlling an operation of the radio base station 20. For example, the processing circuit 202 executes a process of transmitting various setting information (for example, first setting information and second setting information) to the UEs 10. The various setting information may be referred to as a control signal. For example, the processing circuit 202 may be configured to transmit, to the radio terminals 10, the RRC message including the setting information on the configuration of the sidelink channel for V2X communication. The setting information may include, for example, the setting information on the first reserved region according to the present disclosure. For example, the RRC message may include the setting information on the first reserved region according to the present disclosure. The setting information on the first reserved region may include, for example, the information to be used by the radio terminals 10 to identify the position of the first reserved region and the size of the first reserved region.

The memory 203 is a circuit configured to store and hold data and a program that relate to the baseband signal process to be executed by the processing circuit 202. The memory 203 is configured to include at least both or either one of a nonvolatile storage device and a volatile storage device. As the memory 203, for example, a random-access memory (RAM), a read-only memory (ROM), a solid-state drive (SSD), a hard disk drive (HDD), or the like may be used. In FIG. 13, the memory 203 is a collective term of various storage devices, such as main storage devices and auxiliary storage devices. Regarding the memory 203, two or more memories 203 may be implemented according to each of the layers of the wireless communication protocol stack for the wireless communication system 1 in the same manner as the processing circuit 202. For example, a memory 203 that is used for the process as the MAC entity belonging to the MAC layer, a memory 203 that is used for the process as the RLC entity belonging to the RLC layer, and a memory 203 that is used for the process as the PDCP entity belonging to the PDCP layer may be individually implemented.

The wired communication circuit 204 converts data into packet data in a format enabling output to another device and transmits the packet data to the other device. The wired communication circuit 204 extracts data and the like from packet data received from the other device and outputs the data to the memory 203 and the processing circuit 202. As an example of the other device, another radio base station, a mobility management entity (MME), a serving gateway (SGW), or the like may be used. The MME or the SGW is also referred to as a core node. A logical communication interface that is used for communication with the core node may be referred to as an S1 interface. A logical communication interface that is used for communication with the other radio base station may be referred to as an X2 interface. Note that the names of the foregoing various devices may be changed in formulation of specifications of LTE or 5G.

The foregoing detailed description will clarify characteristics and advantages of the present disclosure. It is intended that the claims cover the foregoing characteristics and advantages of the present disclosure without departing from the spirit and scope of the claims. An ordinally skilled person in the art may easily conceive various improvements and changes. Therefore, it is not intended that the scope of the inventive disclosure is limited to the foregoing, and it may be possible to be based on appropriate improvements and equivalents included in the scope disclosed herein. For example, each of the processes disclosed herein may not be chronologically executed in the order described as the examples of the process procedures. The order that each of the processes is executed and the order that another one of the processes is executed may be switched to each other within the gist of the present invention described in the claims. Alternatively, a plurality of processes may be executed in parallel. Note that a condition that may occur in a 5G system clarified from the foregoing detailed description may be found when the 5G system is studied from an aspect, and that another condition may be found when the 5G system is studied from another aspect. For example, the characteristics and advantages of the present invention are not limited to applications that solve the conditions specified in the foregoing detailed description.

Lastly, the configurations described in each of the embodiments and the modification examples in the present invention are an example for employing the technical ideas of the present disclosure, it is not intended that the present invention is limited to the configurations described in each of the embodiments and the modification examples, and the present disclosure may be applied in other embodiments included in the claims in the same manner. For example, note that the names of the terms used in the present disclosure may be changed in formulation of specifications of an LTE system, a 5G system, or V2X communication. Note that one or more other names listed for each of the terms used in the present disclosure are synonymous with each other.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A terminal comprising:
   a controller configured to select, based on a result of sensing, a radio resource for transmitting a signal; and
   a transmitter configured to transmit the signal, wherein
   when the controller detects a predetermined first event, the controller removes a first radio resource belonging to a first reserved region from selection targets.

2. The terminal according to claim 1, wherein
   when a signal composed of a predetermined signal sequence is detected in a second reserved region, the controller determines that the first event has been detected.

3. The terminal according to claim 2, wherein
   the first reserved region includes a plurality of first divided regions,
   the second reserved region includes a plurality of second divided regions,
   each of the plurality of first divided regions is corresponded to one of the plurality of second divided regions,
   the controller determines whether or not the signal composed of the predetermined signal sequence is detected in each of the plurality of second divided regions, and
   the controller removes, from the selection targets, a second radio resource belonging to the first divided region corresponded to the second divided region in which the signal composed of the predetermined signal sequence has been detected.

4. The terminal according to claim 1, wherein
the controller removes, from the selection targets, the first resource belonging to the first reserved region during a time period which is from the detection of the first event to a predetermined time period elapses.

5. The terminal according to claim 1, wherein
the sensing is executed on a predetermined radio resource, and when the first event is not detected, the radio resource belonging to the first reserved region is permitted to be included in the selection targets.

6. The terminal according to claim 1, further comprising:
a receiver configured to receive from a base station a radio resource control (RRC) message including information indicating the first reserved region.

7. A wireless communication system comprising:
a first terminal configured to select, based on a result of first sensing, a radio resource for transmitting a first signal; and
a second terminal configured to select, based on a result of second sensing, a radio resource for transmitting a second signal; and
the first terminal is configured to remove, from selection targets, a first radio resource belonging to a first reserved region when the first terminal detects a predetermined first event, and
the second terminal is configured to output the first event.

8. The wireless communication system according to claim 7, wherein
the first terminal is configured to determine that the first event has been detected when a signal composed of a predetermined signal sequence is detected in a second reserved region, and
the second terminal is configured to output the signal composed of the predetermined signal sequence in the second reserved region.

9. The wireless communication system according to claim 7, wherein
the first reserved region includes a plurality of first divided regions,
the second reserved region includes a plurality of second divided regions,
each of the plurality of first divided regions is associated with a respective one of the plurality of second divided regions,
the first terminal is configured to determine whether the signal composed of the predetermined signal sequence is detected in each of the plurality of second divided regions, and
the first terminal is configured to remove, from the selection targets, a second radio resource belonging to the first divided region associated with the second divided region in which the signal composed of the predetermined signal sequence has been detected, and
the second terminal is configured to output the signal composed of the predetermined signal sequence in one or more of the second divided regions.

10. The wireless communication system according to claim 7, wherein
the first sensing is executed on a predetermined radio resource, and
when the first radio terminal does not detect the first event, the first radio resource belonging to the first reserved region is permitted to be included in the selection targets.

11. The wireless communication system according to claim 7, further comprising:
a base station configured to transmit to the first terminal a radio resource control (RRC) message including information indicating the first reserved region.

12. A base station communicating with a terminal, the base station comprising:
a memory; and
a transmitter coupled to the memory and configured to transmit to a terminal a radio resource control (RRC) message including information indicating a reserved region,
wherein a radio resource belonging to the reserved region is removed from selection targets when the terminal detects a predetermined event.

13. The terminal according to claim 1, wherein the selection targets are configured by the first reserved region.

14. The terminal according to claim 1, wherein the predetermined first event is an urgent event.

* * * * *